(12) United States Patent
Yamada et al.

(10) Patent No.: US 8,111,370 B2
(45) Date of Patent: Feb. 7, 2012

(54) LIQUID CRYSTAL DISPLAY PANEL, LIQUID CRYSTAL DISPLAY UNIT, LIQUID CRYSTAL DISPLAY DEVICE, TELEVISION RECEIVER, AND METHOD FOR MANUFACTURING COLOR FILTER SUBSTRATE

(75) Inventors: Naoshi Yamada, Osaka (JP); Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 374 days.

(21) Appl. No.: 12/515,448

(22) PCT Filed: Oct. 24, 2007

(86) PCT No.: PCT/JP2007/070696
§ 371 (c)(1),
(2), (4) Date: May 19, 2009

(87) PCT Pub. No.: WO2008/090652
PCT Pub. Date: Jul. 31, 2008

(65) Prior Publication Data
US 2010/0073613 A1  Mar. 25, 2010

(30) Foreign Application Priority Data
Jan. 26, 2007  (JP) .................................. 2007-017147

(51) Int. Cl.
*G02F 1/1339* (2006.01)
(52) U.S. Cl. ........................................ 349/157; 349/155
(58) Field of Classification Search ........... 349/155–157
See application file for complete search history.

(56) References Cited

U.S. PATENT DOCUMENTS

| | | | | |
|---|---|---|---|---|
| 6,924,871 | B2 * | 8/2005 | Washizawa et al. | 349/156 |
| 7,659,960 | B2 * | 2/2010 | Doi et al. | 349/155 |
| 7,796,233 | B2 * | 9/2010 | Park et al. | 349/155 |
| 7,936,438 | B2 * | 5/2011 | Seo et al. | 349/157 |
| 2001/0005257 | A1 | 6/2001 | Yamada et al. | |
| 2004/0114090 | A1 | 6/2004 | Washizawa | |
| 2006/0181667 | A1 | 8/2006 | Doi et al. | |
| 2006/0281211 | A1 | 12/2006 | Yoon et al. | |
| 2007/0002261 | A1 * | 1/2007 | Lee et al. | 349/155 |
| 2007/0019148 | A1 | 1/2007 | Ueda | |

(Continued)

FOREIGN PATENT DOCUMENTS

CN  1499267 A  5/2004

(Continued)

OTHER PUBLICATIONS

U.S. Appl. No. 12/671,647, filed Feb. 1, 2010, entitled "Liquid Crystal Panel, Liquid Crystal Display Unit, Liquid Crystal Display Device, and Television Receiver".

(Continued)

*Primary Examiner* — Rhonda Peace
(74) *Attorney, Agent, or Firm* — Nixon & Vanderhye P.C.

(57) ABSTRACT

A liquid crystal display panel (1x) includes an active matrix substrate (3), a liquid crystal material (40), and a color filter substrate (30), wherein a spacer (33) is provided between the active matrix substrate (3) and the color filter substrate (30), and the color filter substrate (30) includes a step section (7) for restricting a movement of a spacer, the step section being provided so as to surround the spacer (33). This makes it possible to restrict the movement of the spacer in the liquid crystal display panel, thereby improving evenness of a cell gap.

30 Claims, 26 Drawing Sheets

U.S. PATENT DOCUMENTS

2007/0146618 A1 * 6/2007 Hashimoto .................. 349/155

FOREIGN PATENT DOCUMENTS

| | | |
|---|---|---|
| CN | 1881015 A | 12/2006 |
| JP | 57-058124 | 4/1982 |
| JP | 8-122753 | 5/1996 |
| JP | 2001-033817 | 2/2001 |
| JP | 2001-183637 | 7/2001 |
| JP | 2004-145102 | 5/2004 |
| JP | 2005-10412 | 1/2005 |
| JP | 2005-258137 | 9/2005 |
| JP | 2006-171378 | 6/2006 |
| JP | 2006-208728 | 8/2006 |
| JP | 2006-208728 A | 8/2006 |
| JP | 2006-350306 | 12/2006 |

OTHER PUBLICATIONS

International Search Report for PCT/JP2007/070696, mailed Nov. 20, 2007.

* cited by examiner

LIQUID CRYSTAL DISPLAY PANEL, LIQUID CRYSTAL DISPLAY UNIT, LIQUID CRYSTAL DISPLAY DEVICE, TELEVISION RECEIVER, AND METHOD FOR MANUFACTURING COLOR FILTER SUBSTRATE

This application is the U.S. national phase of International Application No. PCT/JP2007/070696 filed 24 Oct. 2007, which designated the U.S. and claims priority to Japan Application No. 2007-017147 filed 26 January 2007, the entire contents of each of which are hereby incorporated by reference.

TECHNICAL FIELD

The present invention relates to a liquid crystal display panel that includes spacers.

BACKGROUND ART

In a liquid crystal display panel, spacers are provided between an active matrix substrate that includes a switching element such as a thin film transistor (TFT) or the like on a glass substrate and a color filter substrate that includes colored layers (color filter layer) of R, G, and B. A liquid crystal material is provided in a space thus formed between the active matrix substrate and the color filter substrate by provision of the spacers. A Patent Literature 1 discloses a method for providing spherical spacers on an active matrix substrate or on a color filter substrate based on an ink jet method.

However, a large-size liquid crystal display panel, in particular, may be easily deflected by shaking or a shock occurred when it is assembled or transported, and spacers in the liquid crystal display panel may easily move. Such movements of the spacers cause an uneven thickness (cell gap) of a liquid crystal material, thereby resulting in a deterioration in a display quality. In order to approach this problem, a Patent Literature 2 discloses a method for restricting movements of spacers through provision of plural ridge-like walls (dikes) on each substrate and thereby improving evenness of a cell gap. On the other hand, a Patent Literature 3 discloses a method for restricting movements of spacers through provision of the spacers in a ditch formed in an active matrix substrate or in a color filter substrate and thereby improving evenness of a cell gap.

CITATION LIST

Patent Literature 1

Japanese Patent Application Publication, Tokukai, No. 2005-10412 (Publication Date: Jan. 13, 2005)

Patent Literature 2

Japanese Patent Application Publication, Tokukai, No. 2005-258137 (Publication Date: Sep. 22, 2005)

Patent Literature 3

Japanese Patent Application Publication, Tokukai, No. 2004-145102 (Publication Date: May 20, 2004)

SUMMARY OF INVENTION

However, the Patent Literature 2 discloses an arrangement in which the ridge-like walls are merely provided in parallel with each other. As such, the spacers may move along the ridge-like walls (the spacers may move in a direction in which the ridge-like walls extend), thereby causing unevenness in arrangement of the spacers. Thus, the arrangement suffers from a risk that may cause unevenness of a cell gap. Likewise, the Patent Literature 3 discloses an arrangement in which the spacers provided in the ditch may move along it to cause unevenness in arrangement of the spacers. Thus, the arrangement suffers from a risk that may cause unevenness of the cell gap.

The present invention is made in the view of the problem, and an object of the present invention is to restrict movements of spacers in a liquid crystal display panel with a higher efficiency and thereby to improve evenness of a cell gap.

The liquid crystal display panel of the present invention is a liquid crystal display panel that includes (i) a first substrate including a transistor, a pixel electrode, and a signal line, (ii) a liquid crystal material, and (iii) a second substrate including a counter electrode and a light shielding layer, wherein: a spacer is provided between the first and the second substrates; and one of the first and the second substrates includes a step section for restricting a movement of the spacer, the step section being provided so as to surround the spacer.

In the arrangement, the step section surrounding the spacer restricts the movement of the spacer, and as such, it is possible that the movement of the spacer be kept fairly minimum even when the spacer moves due to shaking of or a shock to the liquid crystal display panel. This makes it possible to improve evenness of a cell gap. Such an effect is particularly remarkable in a case where a spacer having a spherical shape (e.g., a spherical spacer) is used in a large-size liquid crystal display panel that may be easily deflected by a shake or a shock (i.e., a liquid crystal display panel in which a spacer may easily move).

It is desirable that the liquid crystal display panel of the present invention be arranged such that the step section and the signal line overlap each other. This causes a leakage of light less likely to be occurred even when a part of the light shielding layer is thinned or removed so as to form the step section.

The liquid crystal display panel of the present invention may be arranged such that the second substrate includes the step section. In this case, the step section can be formed by a depression in a surface of the second substrate, and the depression can be formed by boring or thinning a part of the light shielding layer. Alternatively, the step section can be formed by a depression in a surface of the second substrate, and the depression can be formed by boring or thinning a part of an insulating film provided above the light shielding layer. This causes the step section to have a high end part at substantially a same level as an adjacent region, and as such, it is easier to provide a film (e.g., an alignment film) under the depression as compared to an arrangement in which a step section has a high end part at higher level than an adjacent region. In this case, in order that a leakage of light is prevented, it is desirable that the step section and various signal lines overlap each other.

The liquid crystal display panel of the present invention may be arranged such that the second substrate includes a colored layer, and an end part of the colored layer and the light shielding layer overlap each other, so that at least a part of the step section is formed. This makes it possible to form the step section concurrently with provision of the colored layer and the light shielding layer, thereby reducing a labor of a manufacturing process.

The liquid crystal display panel of the present invention may be arranged such that the light shielding layer constitutes a black matrix. Further, liquid crystal display panel of the present invention may be arranged such that the light shielding layer is able to be formed based on an application method.

The liquid crystal display panel of the present invention may be arranged such that the first substrate includes the step section. In this case, the step section can be formed by a depression in a surface of the first substrate, and the depression can be formed by boring or thinning a part of an insulating film provided in the first substrate. The insulating film may be a gate insulating film or an interlayer insulating film provided above the gate insulating film. This causes the step section to have a high end part at substantially a same level as an adjacent region, and as such, it is easier to provide a film (e.g., an alignment film) under the depression as compared to an arrangement in which a step section has a high end part at higher level than an adjacent region.

The arrangement in which the depression or the thin film section is formed in the gate insulating film is particularly preferable in a case where a thick gate insulating film is provided. The thick gate insulating film reduces an embossment formed due to a scanning signal line, and as such, the embossment to be traveled over by a data signal line at an intersection of the scanning signal line and the data signal line is small. As a result, breakage of the data signal line is less likely to occur. In this case, an example of a material for the gate insulating film may include an SOG film made from a spin-on glass (SOG) material. That is, the thin film section may be formed by boring a part of the SOG film or removing the SOG film to a certain depth from a surface of the SOG film. Further, the gate insulating film may include a first gate insulating layer and a second insulating layer (e.g., the gate insulating film may include a first gate insulating layer made of an SOG film and a second gate insulating layer made of silicon nitride SiNx). In this case, the step section may be provided by removing the first gate insulating layer by etching. For provision of the step section, it is preferable in view of a transistor's characteristic that the first gate insulating layer be removed by etching. In the case of the gate insulating film made of a SiNx film, however, the gate insulating film suffers from a deterioration in a fine texture (a film quality of the gate insulating film) in a taper section provided in vicinity of the gate electrode (the scanning signal line), and as such, breakage of the SiNx film by static electricity is more likely to occur. In order to prevent the breakage of the SiNx film, the first gate insulating layer made of the SOG material is provided on the second gate insulating layer made of the SiNx film, as described above, such that a film thickness can be secured in the taper section.

The liquid crystal display panel of the present invention may be arranged such that the insulating film is able to be formed based on an application method. The application method makes it easier to provide a thick film as compared to a CD method or a sputtering method, and as such, it is possible that depression having a sufficient depth be formed with certainty.

An example of the film formable based on the application method includes a film containing an organic matter. Examples of the film containing the organic matter may include an SOG film made of a spin-on-glass (SOG) material and a resin film made of an acrylic resin, an epoxy resin, a polyimide resin, a polyurethane resin, a novolac resin, or a polysiloxane resin. In a case where such a resin film is given a photosensitivity so as to produce a photosensitive acrylic resin or a photosensitive novolac resin, it is possible that the gate insulating film be formed by photolithography (exposure and development). Because patterning of a wire provided in the active matrix substrate or the like generally involves use of a photosensitive novolac resin, this eliminates the need for an independent manufacturing system (a photolithography device) for formation of the insulating film, and a same developing fluid as being used in the patterning of wire can be used in the formation of the insulating film. An example of the developing fluid may include TMAH (tetramethylammonium hydroxide).

It should be noted that in the present specification, an "acrylic resin" includes acrylic or a compound having a similarity with acrylic. This is also true for other resins.

The liquid crystal display panel of the present invention can be arranged such that, as described above, the gate insulating film includes plural gate insulating layers, and at least one of the gate insulating layers is partially bored.

The liquid crystal display panel of the present invention can be arranged such that the interlayer insulating film includes plural interlayer insulating layers, and at least one of the interlayer insulating layers is partially bored.

The liquid crystal display panel of the present invention can be arranged such that the step section is formed by a contact hole for electrically connecting the transistor with the pixel electrode. This makes it possible to provide the step section concurrently with formation of the contact hole, thereby reducing a labor of a manufacturing process.

The liquid crystal display panel of the present invention can be arranged such that the signal line is any of a scanning signal line, a data signal line, and a retention capacitor wire.

The liquid crystal display panel of the present invention may be arranged such that plural spacers are provided in a region surrounded by the step section.

The liquid crystal display panel of the present invention may be arranged such that the other of the first and the second substrates includes a step section. This makes it possible to restrict the movement of the spacer with higher certainty.

It is desirable that the liquid crystal display panel of the present invention be arranged such that the spacer is provided based on an ink jet method. This makes it possible to provide the spacer, with high accuracy, in the region surrounded by the step section.

It is preferable that the liquid crystal display panel of the present invention be arranged such that plural spacers including the spacer are provided in a region surrounded by the step section, and the region has an area that is set based on the number of the spacers and a size of each of the spacers. In a case where the spacers are provided by use of an ink jet device, it is desirable that the region have the area that is also set based on an application accuracy of the ink jet device.

The liquid crystal display panel of the present invention may be arranged such that the first substrate is an active matrix substrate, and the second substrate is a color filter substrate.

A liquid crystal display unit of the present invention includes the liquid crystal display panel.

A liquid crystal display device of the present invention includes the liquid crystal display unit.

A television receiver of the present invention includes the liquid crystal display device and a tuner section for receiving television broadcasting.

A method in accordance with the present invention for manufacturing a color filter substrate that faces, in a liquid crystal display panel, an active matrix substrate via a spacer, the method including the steps of: providing plural colored layers at intervals on a transparent substrate; providing a negative type black photosensitive resin film on the colored layers and in a gap formed by adjacent colored layers; carrying out exposure to a front surface of the negative type black photosensitive resin film by use of a mask that has a pattern surrounding a thin film section forming region in the gap formed by the adjacent colored layers; carrying out exposure to a back surface of the negative type black photosensitive resin film by use of the colored layers as a mask; and carrying out development such that the negative type black photosensitive resin film on the colored layers is removed and that the negative type black photosensitive resin film in the thin film section forming region is removed to a given depth from a surface of the negative type black photosensitive resin film.

The method makes it possible to manufacture the color filter substrate that includes, in its surface, the step section for restricting the movement of the spacer. The step section is provided by the thin film section that is formed in the negative type black photosensitive resin film.

In the liquid crystal display panel of the present invention, as described above, the step section surrounding the spacer restricts the movement of the spacer, and as such, the movement of the spacer can be kept fairly minimum even when the spacer moves due to shaking of or a shock to the liquid crystal display panel. This makes it possible to improve the evenness of the cell gap. Such an effect is particularly remarkable in the large-size liquid crystal display panel that may be easily deflected by shaking of or a shock to it (i.e., the liquid crystal display panel in which the spacer may easily move).

Figure 1:
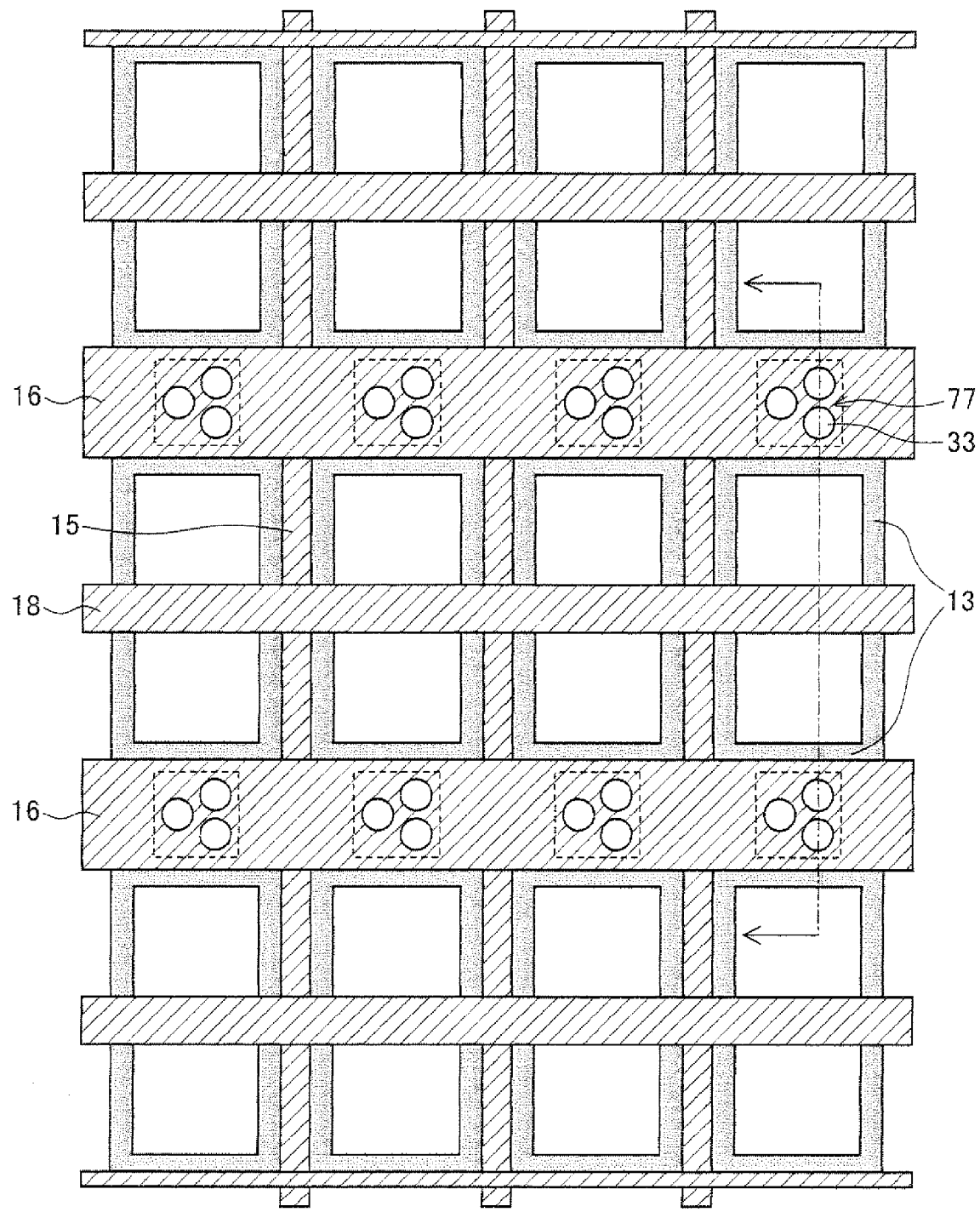
FIG. 1 is a plane view showing an arrangement of a liquid crystal display panel in accordance with First Embodiment.

REFERENCE SIGNS LIST 1x, 1y, 1z, 10a through 10e. Liquid crystal display panel
130a through 130c, 140, 150. Liquid crystal display panel
3. Active matrix substrate
7, 27. Step section
9, 19. Alignment film
13. Black matrix
14. Colored layer
15. Data signal line
16. Scanning signal line
17. Pixel electrode
18. Retention capacitor wire
21. First gate insulating layer
22. Second gate insulating layer
23. Gate insulating film
25. First interlayer insulating layer
26. Second interlayer insulating layer
30. Color filter substrate
33. Spacer
40. Liquid crystal material
55, 66. Seat
57. Protrusion section
58. Overlapping part of the black matrix and the colored
77, 88. Depression
100. Liquid crystal display unit
110. Liquid crystal display device
601. Television receiver

DESCRIPTION OF EMBODIMENTS

Embodiments of the present invention are described below with reference to FIGS. 1 through 27.

First Embodiment

Figure 2:
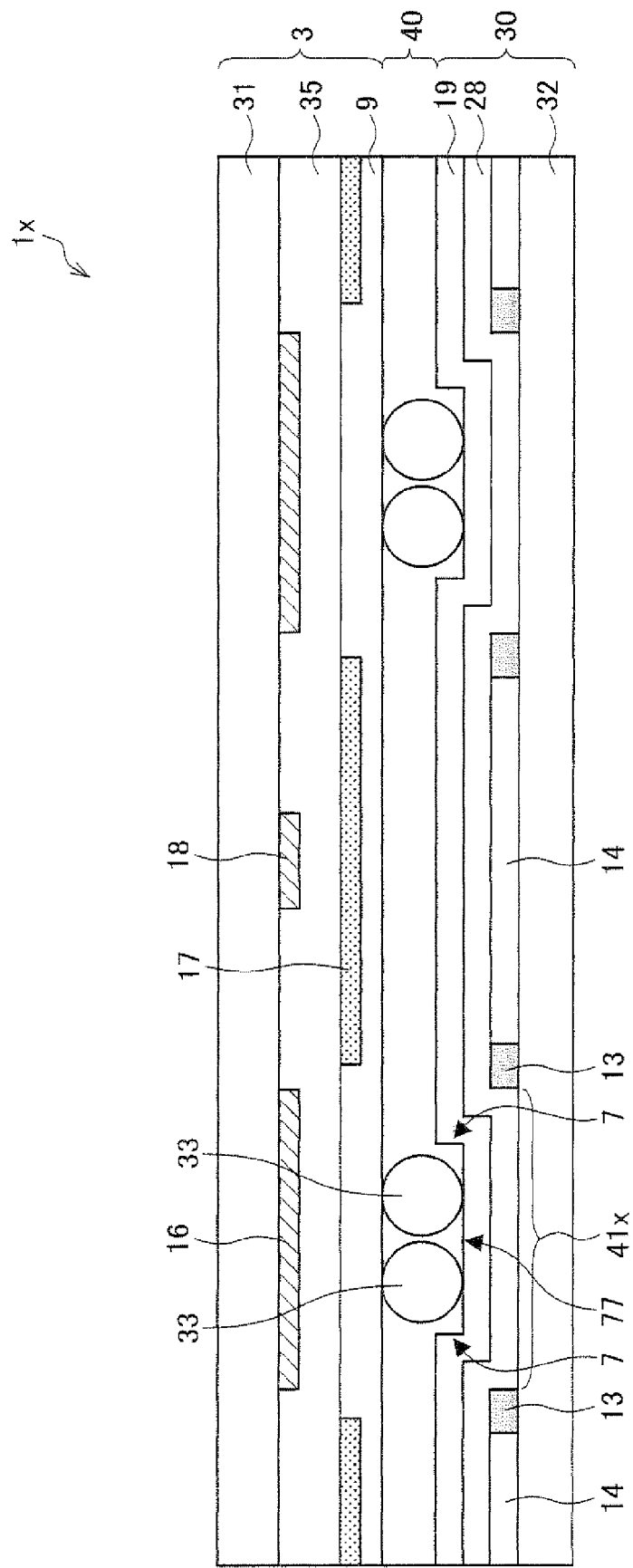
FIG. 2 is a cross sectional view showing the arrangement of the liquid crystal display panel in accordance with First Embodiment.
Figure 3:
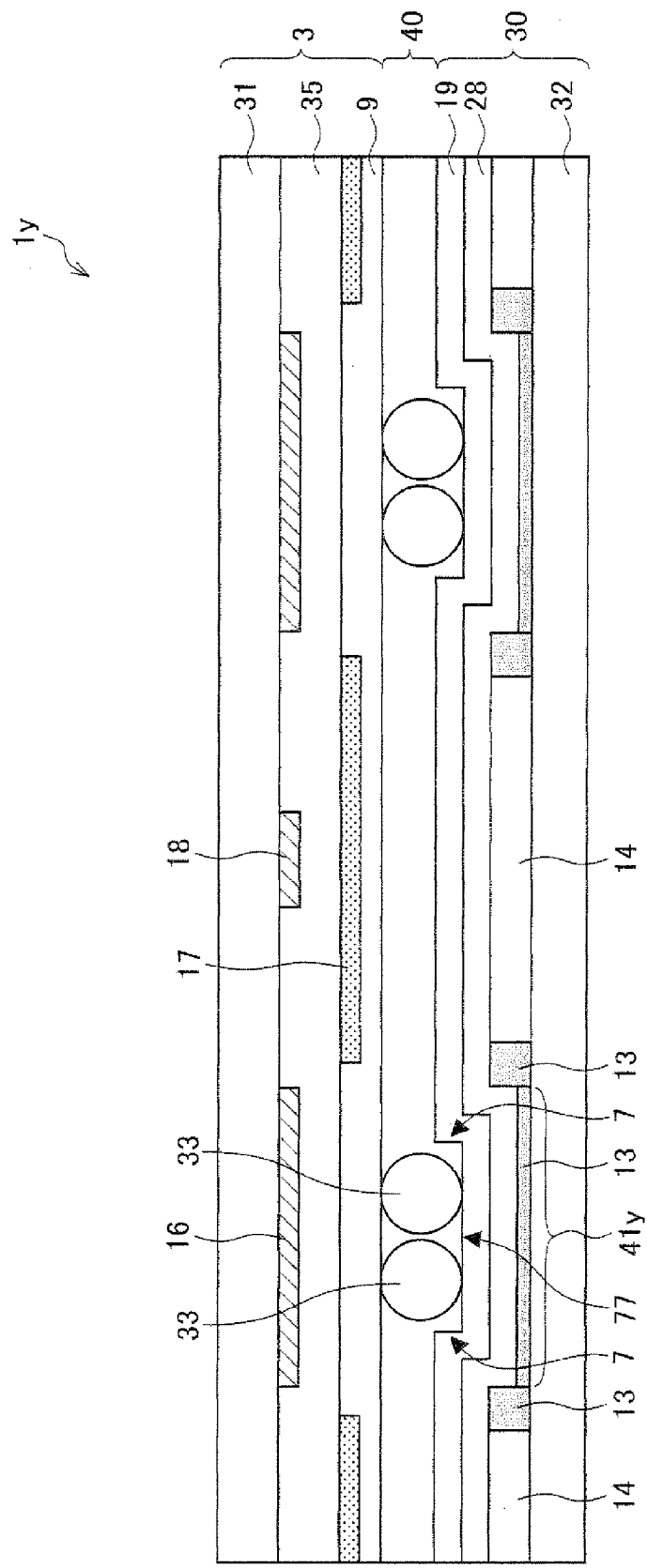
FIG. 3 is a cross sectional view showing another arrangement of the liquid crystal display panel in accordance with Second Embodiment.

FIG. 1 is a plane view showing a part of a liquid crystal display panel in accordance with the present embodiment. FIG. 2 is a cross sectional view taken on arrows in FIG. 1. In the liquid crystal display panel of the present embodiment, a plurality of depressions 77, in each of which spacers 3 are provided, is provided at intervals below a scanning signal line 16 (see FIG. 1).

As shown in FIG. 2, a liquid crystal display panel 1x includes an active matrix substrate 3, a color filter 30, spacers 33 provided between the active matrix substrate 3 and the color substrate 30, and a liquid crystal material 40 sealed in a space formed by the substrates (the active matrix substrate 3 and the color filter substrate 30) and a seal (which is not illustrated) provided on external surfaces of the liquid crystal display panel 1x.

As shown in FIGS. 1 and 2, the active matrix substrate 3 includes scanning signal lines 16 that extend in a transverse direction of the drawing in FIG. 1, data signal lines 15 that extend in a longitudinal direction of the drawing in FIG. 1, and retention capacitor wires 18 that extend in the transverse direction of the drawing in FIG. 1. In vicinity of an intersection of a scanning signal line 16 and a data signal line 15, a transistor (a TFT, which is not shown) is provided. Though not being shown in the drawings, the transistor includes a source electrode connected with the data signal line 15, a gate electrode connected with the scanning signal line 16, and a drain electrode connected with a pixel electrode 17 via a drain extraction electrode (which is not shown) or the like. Each of the retention capacitor wires 18 faces such a drain extraction electrode or a pixel electrode via a member such as a gate insulating film or the like, so that a retention capacity is obtained. The data signal line 15, the scanning signal line 16, and a retention capacitor wire 18 are made of a light shielding metal film.

On the other hand, the color filter substrate 30 includes a black matrix 13 (light shielding layer), made of a light shielding film and provided in a matrix manner, and a colored layer 14 (color filters) of red (R), green (G), or blue (B) color provided in a region surrounded by the black matrix 13 (see FIGS. 1 and 2). The black matrix 13 is provided such that (i) the black matrix 13 and (ii) the data signal line 15 and the scanning signal line 16 in the active matrix substrate 3 overlap each other. The colored layer 14 is provided such that the colored layers 14 and the pixel electrode 17 in the active matrix substrate 3 overlap each other.

The following description explains, in detail, with how the liquid crystal display panel 1x of the present embodiment 1 is arranged.

As shown in FIG. 2, the active matrix substrate 3 includes (i) a transparent substrate 31, (ii) scanning signal lines 16, (iii) retention capacitor wires 18, (iv) an insulating layer 35 made of a gate insulating film, TFTs (which are not shown), an interlayer insulating film, (v) pixel electrodes 17, and (vi) an alignment film 9. On the transparent substrate 31, the scanning signal lines 16 and the retention capacitor wires 18 are provided. The gate insulating film is provided on the scanning signal lines 16 and the retention capacitor wires 18. On the gate insulating film, members such as a semiconductor layer (which is not shown) forming a channel of a transistor, the data signal lines 15 (see FIG. 1), electrodes of the transistor (which are not shown), and drain extraction electrodes (which are not shown) are provided. The interlayer insulating film is provided above such wires and electrodes. On the interlayer insulating film, the pixel electrodes 17 are provided, and the alignment film 9 is provided so as to cover the pixel electrodes 17. The alignment film 9 aligns liquid crystal molecules, and makes contact with the liquid crystal material 40. It should be noted that the drawings do not show an embossment or the like formed in a part where the insulating film 35 and a member such as the scanning signal lines 16 or the like overlap each other.

The color filter substrate 30, on the other hand, includes a transparent substrate 32, the black matrix 13, colored layers 14 (R, G, and B), a transparent counter electrode (common electrode) 28, and an alignment film 19 (see FIG. 2). On the transparent substrate 32, the black matrix 13 and the colored layers 14 are provided. The counter electrode 28 is provided so as to cover the black matrix 13 and the colored layers 14. On the counter electrode 28, the alignment film 19 is provided. The colored layers 14 of R, G, and B are regularly arranged for a pixel region, and the black matrix 13 is provided in a gap formed by adjacent colored layers 14.

In the black matrix 13, depression sections 41x having a rectangular shape are formed below each scanning signal line 16 (see FIGS. 1 and 2). In each of the depression sections 41x, the light shielding film is removed. This causes depressions 77 having a rectangular shape to be formed in a surface of the color filter substrate 30 via the counter electrode 28 and the alignment film 19 that are provided on and above the black matrix 13. A step section 7 is formed by each of the depressions 77. The spacers 33 are provided in each of the depressions 77.

In the liquid crystal display panel 1x of the present embodiment, the step section 7 restricts movements of the spacers 33 provided in the depression 77, and as such, the movements of the spacers 33 are kept fairly minimum even when the spacers 33 move due to shaking of or a shock to the liquid crystal display panel 1x. This makes it possible to improve evenness of a cell gap. Such an effect is particularly remarkable in a large-size liquid crystal display panel that may be easily deflected by a shake or a shock (i.e., a liquid crystal display panel in which spacers may easily move).

In the liquid crystal display panel 1x, the step section 7 has its high end part at substantially a same level as an adjacent region. This brings about another effect that makes it easier to provide the alignment film 19 below each of the depressions 77, as compared to an arrangement in which a step section has its high end part at a level higher than an adjacent region.

It should be noted that the scanning signal lines 16 are made of a light shielding metal, and as such, even though a part of the black matrix 13 is bored (or removed), there is hardly any influence on a display quality due to a leakage of light.

FIG. 2 shows the arrangement in which a part of the black matrix 13 is bored. However, the present embodiment is not limited to this. Alternatively, a part of the black matrix 13 can be a thin film section as in a liquid crystal display panel 1y shown in FIG. 3. That is, the black matrix 13 includes thin film sections 41y having a rectangular shape, below each scanning signal line 16 (see FIG. 3). In each of the thin film sections 41y, the light shielding film has a film thickness thinner than an adjacent region. This causes depressions 77 having a rectangular shape to be formed in a surface of a color filter substrate 30 via a counter electrode 28 and an alignment film 19 that are provided on and above the black matrix 13. A step section 7 is formed by each of the depressions 77. Spacers 33 are disposed in each of the depressions 77. An active matrix substrate 3, on the other hand, has a same arrangement as shown in FIG. 2.

The following description deals with one example of a method for manufacturing an active matrix substrate.

First, one or a combination of metals such as titanium, chrome, aluminum, molybdic, tantalum, tungsten, and copper is formed in a film on a transparent insulating substrate by a sputtering method or the like. Then, a photo etching method or the like is carried out so as to form a required pattern on a metal film or an alloy film thus formed. This causes a retention capacitor wire and a scanning signal line (a gate electrode of a TFT), both having a film thickness of approximately 0.5 μm, to be formed.

Then, a gate insulating film having a film thickness of approximately 0.4 μm and a semiconductor layer (a semiconductor layer constituted by a high-resistivity semiconductor layer and a low-resistivity semiconductor layer) having a film thickness of approximately 0.2 μm are successively formed by a plasma CVD method (chemical vapor deposition method) or the like. Thereafter, a photo etching method or the like is carried out so as to form a pattern on the gate insulating film and the semiconductor layers.

Then, a data signal line, a source electrode, a drain electrode, and a drain extraction electrode, each having a film thickness of approximately 0.3 μm, are formed. It is possible that these members be formed in the same way. Specifically, one or a combination of metals such as titanium, chrome, aluminum, molybdic, tantalum, tungsten, and copper is formed in a film by a sputtering method or the like. Thereafter, a photo etching method or the like is carried out so as to form a required pattern on a metal film or an alloy film thus formed.

Then, based on dry etching that is carried out with use of a data signal line pattern, a source electrode pattern, a drain electrode pattern, and a drain extraction electrode pattern as a mask, channel etching is carried out to the high-resistivity semiconductor layer (i layer) made of an amorphous silicon film or the like and the low-resistivity semiconductor layer (n+ layer) made of an n+ amorphous silicon film or the like. Through a process above, a film thickness of the i layer is optimized, and TFTs are formed. Specifically, that part of the semiconductor layer which is not covered by the data signal line, the source electrode, the drain electrode, or the drain extraction electrode is removed based on the etching, and as such, the i layer having a film thickness required for a TFT ability is left.

Then, an interlayer insulating film for protecting (covering) a TFT's channel is formed. In the present embodiment, an inorganic insulating film, made of a material including a silicon nitride or an oxide silicon and having a film thickness of approximately 0.3 μm, is formed by a plasma CVD method or the like.

Further, etching is carried out to the interlayer insulating film based on a position of a contact hole, so that a hole is formed. In this case, for example, a photolithography method (a exposure and development) is carried out so as to form a pattern in a photosensitive resin, and then, the etching is carried out by use of the photosensitive resin.

Subsequently, on the interlayer insulating film, a conductive film having a transparency and a film thickness of approximately 0.1 μm is formed from a material such as ITO, IZO, zinc oxide, or tin oxide by a sputtering method or the like. Thereafter, a photo etching method or the like is carried out so as to form a required pattern in the conductive film.

Then, an alignment film is applied by an ink-jet method or the like. Thus, the active matrix substrate is manufactured.

Next, with reference to FIGS. 1 through 3, 20 and 21, the following description deals with one example of a method for manufacturing a color filter substrate.

First, first through third colored layers corresponding to three elementary colors (red, green, and blue), respectively, are formed.

Specifically, a first colored layer 14 (red) is formed by the following steps: a negative type acrylic photosensitive resin in which a red pigment is dispersed is applied to a transparent substrate 32 by a spin coat method or the like, and then dehydrated; and with use of a photo mask, exposure and development are carried out. Successively, a second colored filter 14 (green) and a third colored filter 14 (blue) are formed in the same way (see (a) of FIG. 20).

Then, a black matrix made of a light shielding film is formed as follows.

Figure 20:
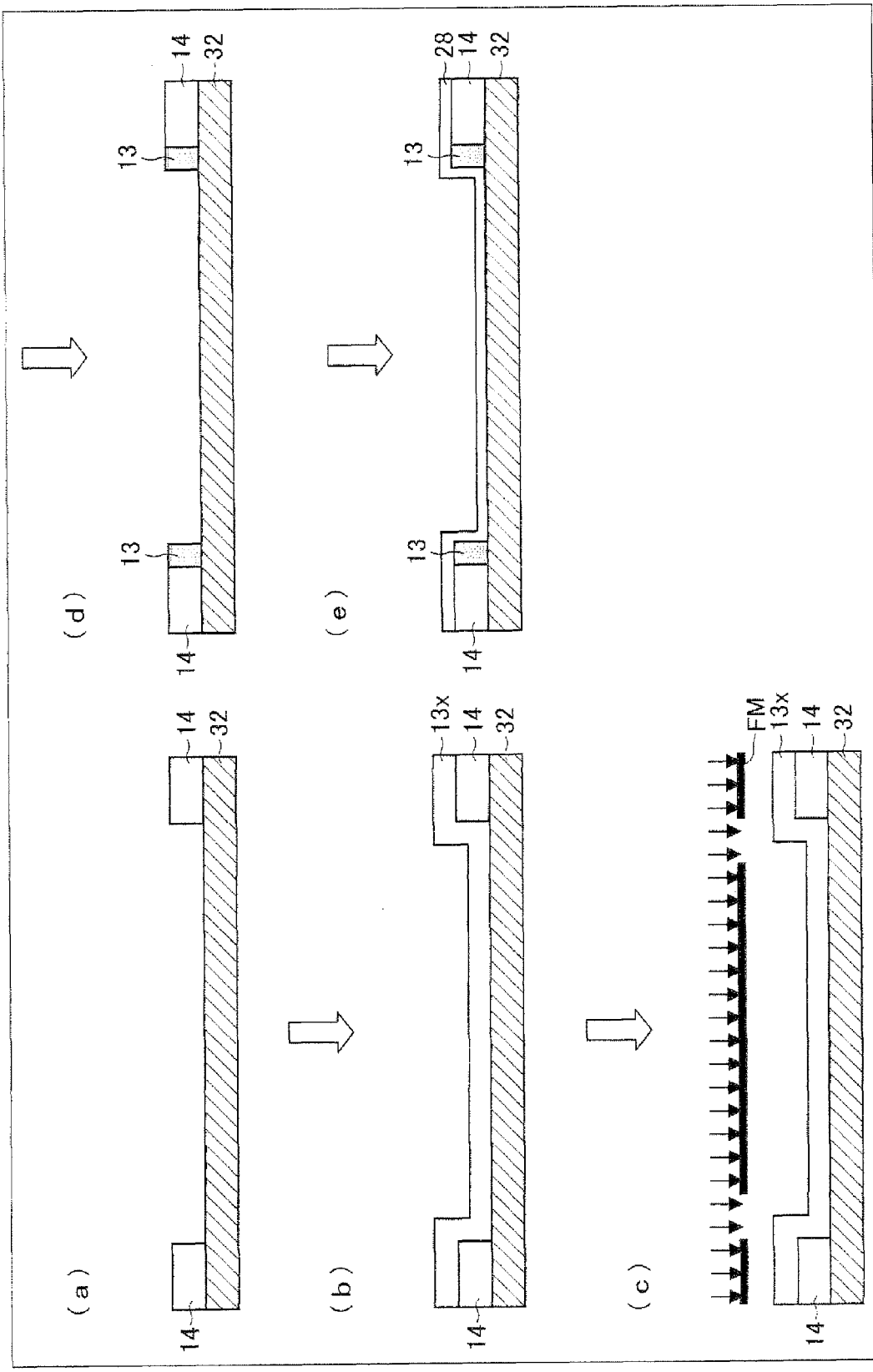
FIG. 20 is a process chart showing a part of a step for manufacturing a liquid crystal display panel in accordance with the present invention.

In the case of formation of a depression section in a part of a black matrix (see FIG. 2), steps as shown in FIG. 20 are carried out. Specifically, the steps includes: applying, by a spin coat method or the like, a negative type acrylic black photosensitive resin film 13x in which a fine carbon particle is dispersed, such that the colored layers are covered by the negative type acrylic black photosensitive resin film 13x (see (b) of FIG. 20); and dehydrating the negative type acrylic black photosensitive resin film 13x, and, then carrying out exposure to its surface with use of a photo mask (see (c) of FIG. 20). A photo mask FM to be used in the exposure has a pattern that blocks exposure to a part corresponding to a pixel region, in which part the colored layers 14 are provided, and exposure to a part corresponding to that part of a gap formed by the colored layers 14 where a depression section (depression section having a rectangular shape) is formed. As such, the exposure to the above two parts is blocked so that the negative type acrylic black photosensitive resin film 13x in these parts is kept from being hardened, whereas exposure to a part other than the above (e.g., a part around the depression section) is allowed so that the negative type acrylic black photosensitive resin film 13x in the part is hardened. Thereafter, development is carried out so that a substantially uncured part of the negative type acrylic black photosensitive resin 13x is removed. It should be noted that a substantially uncured state includes a range of states from a cured state that is practically removable by development to a totally uncured state. As a result of the development, the negative type acrylic black photosensitive resin film 13x is removed from the part corresponding to the pixel region, in which part the colored layers 14 are provided, and from the part corresponding to that part of the gap formed by the colored layers 14 where the depression section is formed, while the negative type acrylic black photosensitive resin film 13x remains without being affected in the part corresponding to the part around the depression section. This allows a black matrix 13 having a desired pattern to be obtained (see (d) of FIG. 20).

Figure 21:
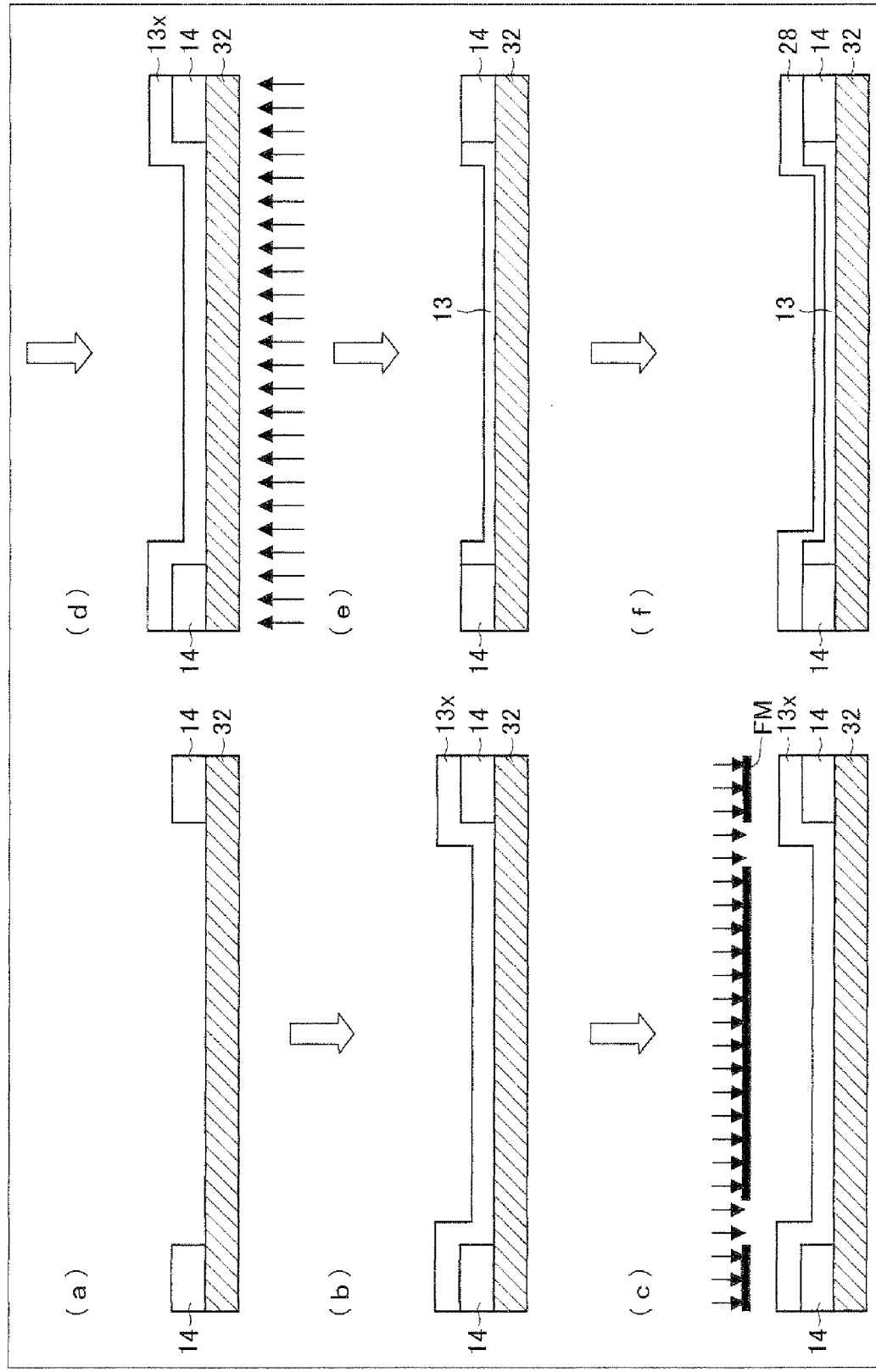
FIG. 21 is a view schematically showing an arrangement of a liquid crystal display unit in accordance with the present invention.

On the other hand, in the case of formation of a thin film section in a part of a black matrix (see FIG. 3), steps as shown in FIG. 21 are carried out. Specifically, the steps include: forming a first colored layer 14 (red), a second colored layer 14 (green), and a third colored layer 14 (blue) (see (a) of FIG. 21); applying, by a spin coat method or the like, a negative type acrylic black photosensitive resin film 13x in which a fine carbon particle is dispersed, such that the first through third colored layers 14 are covered by the negative type acrylic black photosensitive resin film 13x (see (b) of FIG. 21); and dehydrating the negative type acrylic black photosensitive resin film 13x, and carrying out exposure to its surface with use a photo mask FM (see (c) of FIG. 21). The photo mask FM to be used in the exposure has a pattern that blocks exposure to a part corresponding to a pixel region, in which part the colored layers 14 are provided, and exposure to a part corresponding to that part of a gap formed by the colored layers 14 where a thin film section (a thin film section having a rectangular shape) is formed. As such, the exposure to the above two part is blocked so that the negative type acrylic black photosensitive resin film 13x in these parts is kept from being hardened, whereas exposure to a part other than the above (e.g., a part around the thin film section) is allowed so that the negative type acrylic black photosensitive resin film 13x in the part is hardened. Subsequently, by use of the colored layers 14 as a photo mask, exposure (planar exposure to a back surface) is carried out to the negative type acrylic black photosensitive resin film 13x from a back surface of the transparent substrate 32 (see (d) of FIG. 21). As such, the negative type acrylic black photosensitive resin film 13x in the gap formed by the colored layers 14 is hardened near its back surface. After this, development is carried out so that a substantially uncured part of the negative type acrylic black photosensitive resin film 13x is removed. As a result, (i) the negative type acrylic black photosensitive resin film 13x is removed in the part corresponding to the pixel region, in which part the colored layers 14 are provided, (ii) a film thickness of the negative type acrylic black photosensitive resin film 13x is reduced to be thin in the part corresponding to that part of the gap formed by the colored layers 14 where the thin film section is formed, and (iii) the negative type acrylic black photosensitive resin film 13x is left without being affected, in the part corresponding to the part around the thin film section (i.e., the negative type photosensitive acrylic black resin film 13x having a thick film thickness is left in the part corresponding to the part around the thin film section), so that the black matrix 13 having a desired pattern can be obtained (see (e) FIG. 21).

It is possible to adjust the film thickness of the negative type acrylic black photosensitive resin film 13x in the thin film section by adjusting an exposure amount of the planar exposure to its back surface.

After forming the colored layers 14 and the black matrix 13 in the above way, a counter electrode constituted of a transparent electrode 28 that is made of a material such as ITO or the like is formed by a sputtering method (see (e) of FIG. 20 and (f) of FIG. 21), and an alignment film is applied on the counter electrode by an ink jet method or the like. This causes the counter electrode and the alignment film to be provided on and above the depression section or the thin film section in the black matrix 13, and as such, a color filter substrate having a depression 77 of a rectangular shape in its surface is manufactured.

It should be noted that colors of the colored layers 14 are not limited to three elementary colors (red, green, and blue). Alternatively, a colored layer having a color of cyanogen, magenta, or yellow can be provided.

In the present embodiment, furthermore, the black matrix 13 is arranged such that the thin film section has a film thickness of approximately 1.0 μm and a part other than the thin film section has a film thickness of approximately 2.0 p.m. Each of the colored layers is arranged so as to have a film thickness of approximately 1.8 μm. The depression 77 is arranged so as to have a depth of approximately 2.0 μm in a case where the depression section is formed in the black matrix 13 or a depth of approximately 1.0 μm in a case where the thin film section is formed in the black matrix 13. Also, the depression 77 is arranged so as to have an area of approximately 60 μm square.

An effect that restricts movements of the spacers is improved more in a case where the depression is provided by the formation of the depression section in the black matrix. However, in view of the relation of a diameter of each spacer forming a cell gap and the depression depth, it is sufficient that the depression has a depth that is approximately 15% or more of the diameter of each spacer. In a case where a depression section is formed in a black matrix, it can be thought that a deterioration in a display quality be caused by a reflected light, due to influence of members, such as signal wires, which are provided in the active matrix substrate. In such a case, it is possible that a reflected light be prevented by forming the thin film section in the black matrix in consideration of a relation with the diameter of each spacer. Further, it is preferable that the depression have an area that is set by taking into account not only the number of the spacers and a size of each spacer but also an application accuracy of an ink jet device (e.g., approximately ±20 μm). That is, it is desirable that the depression have an area that is adjusted as appropriate based on an application accuracy of an ink jet application device.

Figure 4:
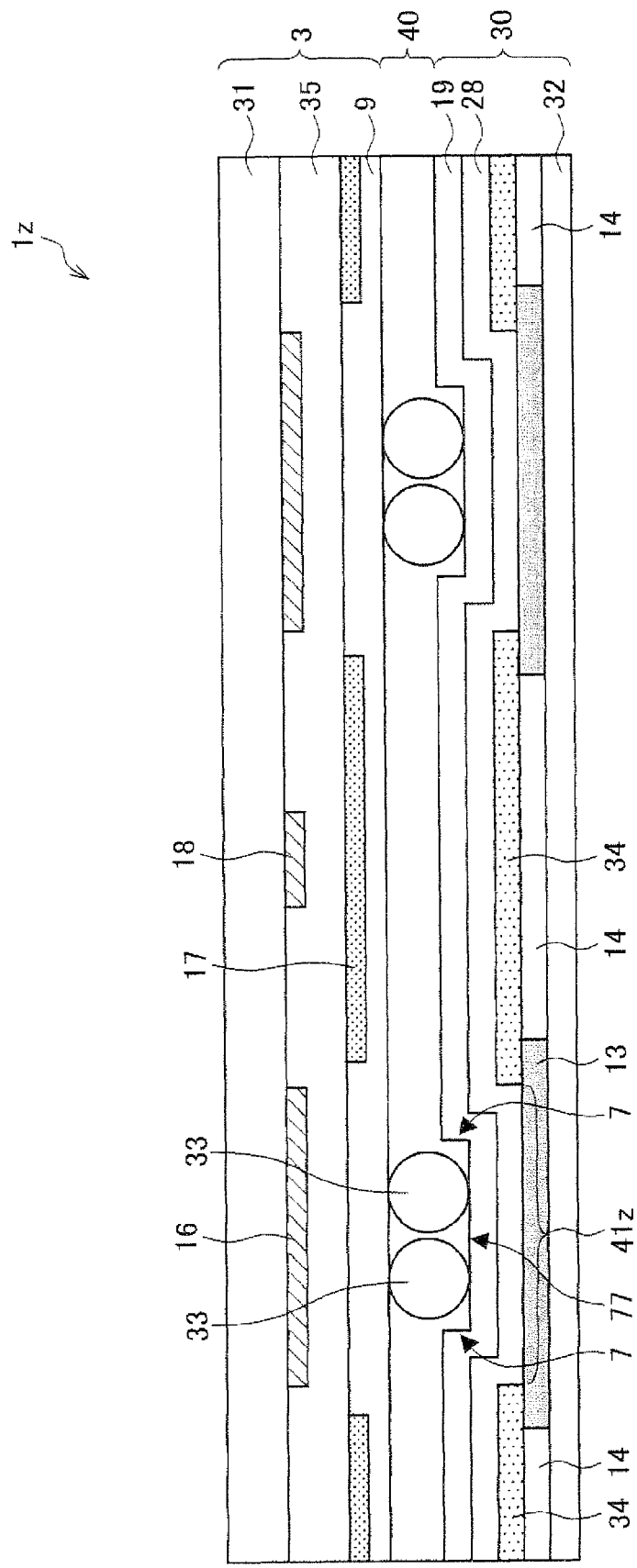
FIG. 4 is a cross sectional view showing yet another arrangement of the liquid crystal display panel in accordance with Second Embodiment.

Further, it is possible that a liquid crystal display panel of the present embodiment be arranged as shown in FIG. 4. Specifically, a color filter substrate 30 of a liquid crystal display panel 1z includes a transparent substrate 32, a black matrix 13, colored layers 14 (R, G, and B), an over coat film 34, a transparent counter electrode 28, and an alignment film 19. On the transparent substrate 32, the black matrix 13 and the colored layers 14 are provided. Above the black matrix 13 and the colored layers 14, the over coat film 34 is provided. The counter electrode 28 is provided on the over coat film 34. The alignment film 19 is provided so as to cover the counter electrode 28.

The over coat film 34 is provided for a purpose of planarization or provided so that patterning of the counter electrode is carried out with ease. The over coat film 34 is made of a material such as, for example, a photosensitive acrylic resin.

In the over coat 34, depression sections 41z having a rectangular shape are formed such that (i) each of the depression sections 41z and (ii) the black matrix 13 and a scanning signal line 16 overlap each other (see FIG. 4). This causes depressions 77 having a rectangular shape to be formed in a surface of the color filter substrate 30 via the counter electrode 28 and the alignment film 19 provided on and above the over coat 34. A step section 7 is formed by each of the depressions 77. Spacers 33 are provided in each of the depressions 77. An active matrix substrate, on the other hand, has a same arrangement as shown in FIG. 2. Each of the depression sections 41z in the over coat film 34 should be formed, by a photolithography method or the like, in such a position that (i) each of the depression sections 41z and (ii) the black matrix 13 or a light shielding metal wire (a scanning signal line 16 or a retention capacitor wire 18) overlap each other.

In each of the arrangements described above, a part of the black matrix 13 is removed below each scanning signal line 16. Alternatively, in a case, for example, where retention capacitor wires are arranged such that the retention capacitor wires and a black matrix overlap each other, the black matrix can be partially removed below each of the retention capacitor wires, thereby forming a depression in a surface of a color filter substrate.

Also, the black matrix 13 can be partially removed below a data signal line, thereby forming a depression in a surface of a color filter substrate. However, it can be said easier to remove a part of the black matrix below a scanning signal line or a retention capacitor wire and thereby to form a depression in a surface of the color filter substrate, because the scanning signal line or the retention capacitor wire has a wider wire width than the data signal line.

That is, there may be a case that a depression has a width that is wider than the data signal line but narrower than the scanning signal line or the retention capacitor wire. Further, even in a case where a wire width of the scanning signal line or the retention capacitor wire requires to be widened in accordance with a width of the depression, it is still possible that influence on an aperture rate be kept minimum. The reason why the scanning signal line has a width wider than the data signal line is attributed to the following: that is, because (i) the number of parasitic capacitors, each of which is provided in an intersection of the scanning signal and the data signal line, is larger for per scanning signal line than per data signal line and (ii) the scanning signal line has a longer wire length, a resistance of the scanning signal line needs to be lowered so that a signal delay is prevented. Besides, in order that a required retention capacitance is secured, the retention capacitor wire may have a wider wire width that allows an increase of an overlapping area of the retention capacitor wire and a pixel electrode or a drain extraction electrode.

Second Embodiment

Figure 5:
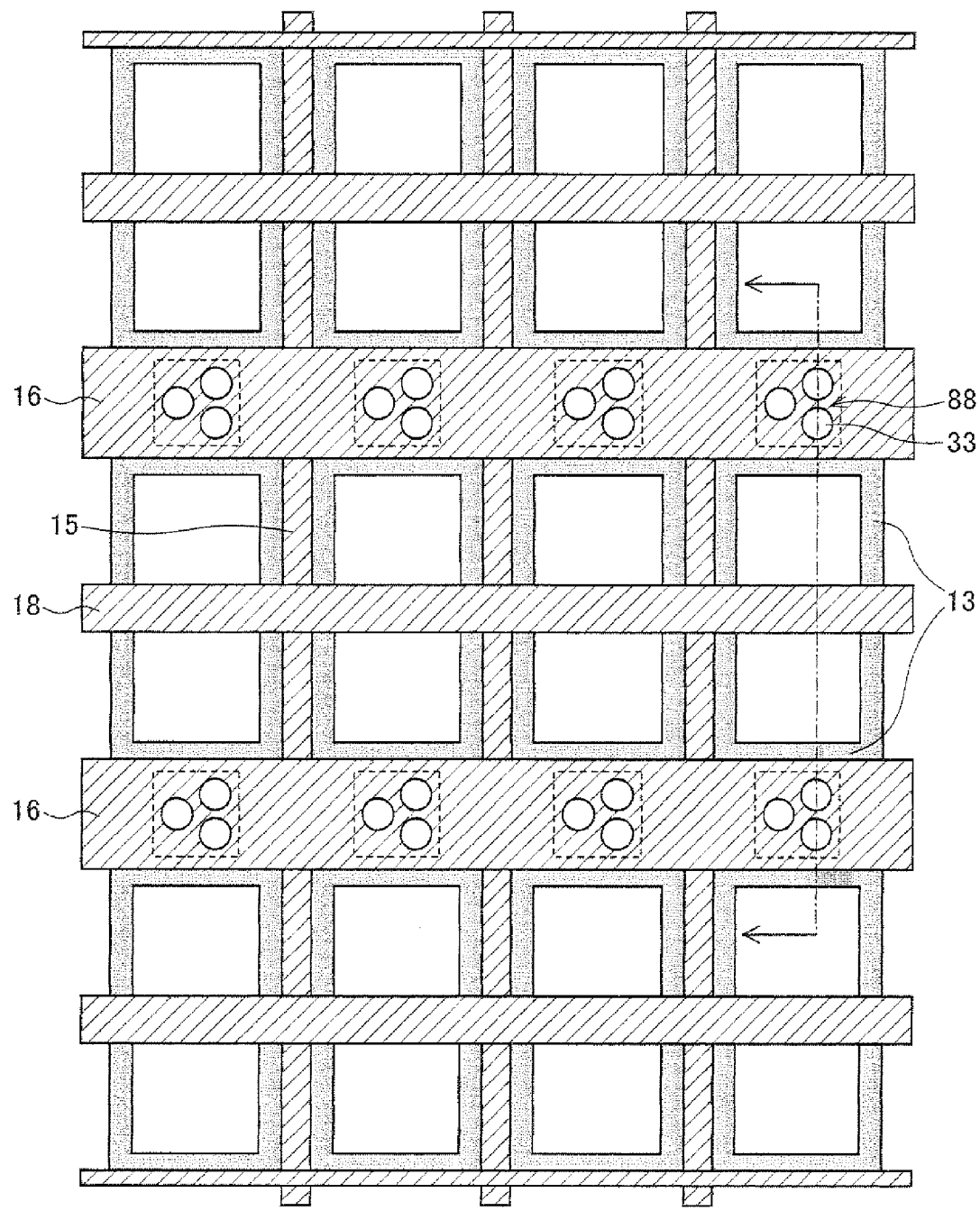
FIG. 5 is a plane view showing an arrangement of a liquid crystal display panel in accordance with Second Embodiment.
Figure 6:
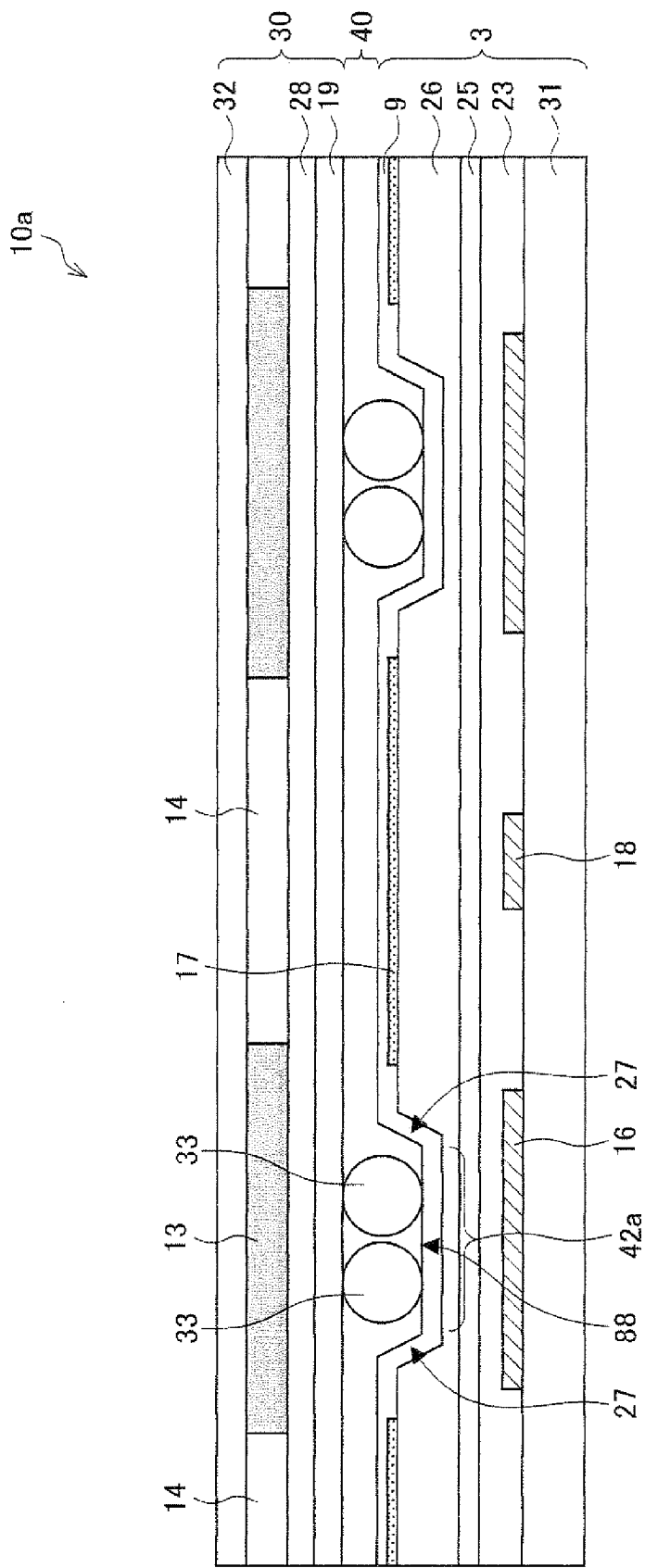
FIG. 6 is a cross sectional view showing the arrangement of the liquid crystal display panel in accordance with Second Embodiment.
Figure 7:
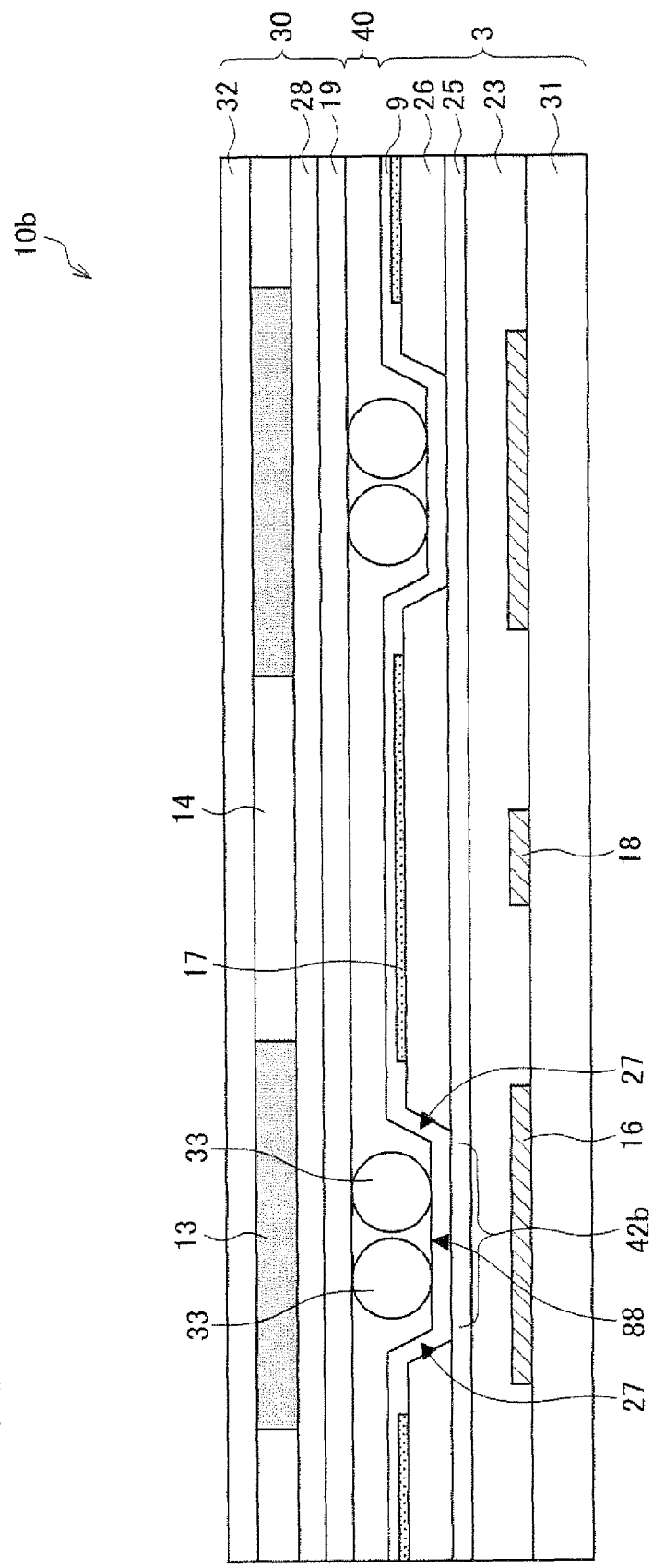
FIG. 7 is a cross sectional view showing another arrangement of the liquid crystal display panel in accordance with Second Embodiment.

FIG. 5 is a plane view showing a part of a liquid crystal display panel in accordance with present embodiment. FIG. 6 is a cross sectional view taken on arrows in FIG. 5. In the liquid crystal display panel of the present embodiment, a plurality of depressions 88, in each of which spacers 33 are provided, is formed at intervals above a scanning line 16 (see FIG. 5). Otherwise, the liquid crystal display panel has a same arrangement as shown in FIG. 1.

As shown in FIG. 6, a liquid crystal panel 10a includes an active matrix substrate 3, a color filter substrate 30, spacers 33 provided between the active matrix substrate 3 and the color filter substrate 30, and a liquid crystal material 40 sealed in a space formed by the substrates (the active matrix substrate 3 and the color filter substrate 30) and a seal provided on external surfaces of the liquid crystal display panel 10a (see FIG. 6).

The active matrix substrate 3 includes a transparent substrate 31, scanning signal lines 16, retention capacitor wires 18, a gate insulating film 23, TFTs (which are not shown), a first interlayer insulating layer 25, a second interlayer insulating layer 26, pixel electrodes 17, and an alignment film 9. On the transparent substrate 31, the scanning signal lines 16 and the retention capacitor wires 18 are provided. The gate insulating film 23 is provided on the scanning signal lines 16 and the retention capacitor wires 18. On the gate insulating film 23, members such as a semiconductor layer (which is not illustrated) forming a channel of a transistor, data signal lines (which are not illustrated), electrodes of the transistor (which are not illustrated), and drain extraction electrodes (which are not illustrated) are provided. The first interlayer insulating layer 25 and the second interlayer insulating layer 26 are provided on and above such wires and electrodes. A pixel electrode 17, which is made of ITO, is provided in that part of the second interlayer insulating film 26 which corresponds to a pixel region. The alignment film 9 is provided so as to cover the pixel electrode 17. It should be noted that the drawings do not show an embossment or the like formed in a part where the gate insulating film 23 and a member such as the scanning signal lines 16 overlap each other.

The color filter substrate 30, on the other hand, includes a transparent substrate 32, a black matrix 13, colored layers 14 (R, G, and B), a transparent electrode (common electrode) 28, and an alignment film 19. On the transparent substrate 32, the black matrix 13 and the colored layers 14 are provided. The counter electrode 28 is provided so as to cover the black matrix 13 and the colored layers 14. The alignment film 19 is provided on the counter electrode 28. The colored layers 14 of R, G, and B are regularly arranged for a pixel region. The black matrix 13 is provided in a gap formed by adjacent colored layers 14.

In the second interlayer insulating layer 26, thin film sections 42a having a rectangular shape are formed so that (i) each of the thin film sections 42a and (ii) the black matrix 13 and a scanning signal line 16 overlap each other (see FIG. 6). In each of the thin film sections 42a, the second interlayer insulating layer 26 has a film thickness thinner than an adjacent part. This causes depressions 88 having a rectangular shape to be formed in a surface of the active matrix substrate 3 via the alignment film 9 provided above the second interlayer insulating layer 26. A step section 27 is formed by each of the depressions 88. The spacers 33 are provided in each of the depressions 88.

In the liquid crystal display panel 10a, the step section 27 restricts movements of the spacers 33 provided in each of the depressions 88, and as such, the movements of the spacers 33 are kept fairly minimum even when the spacers 33 move due to shaking of or a shock to the liquid crystal display panel 10a. This in turn makes it possible to improve evenness of a cell gap. Such an effect is particularly remarkable in a large-size liquid crystal display panel that may be easily deflected by a shake or a shock (i.e., a large-size liquid crystal display panel in which spacers may easily move).

In the liquid crystal display panel 10a, the step section 27 has a high end part at substantially a same level as an adjacent region. This brings about another effect that makes it easier to provide the alignment film in each of the depressions 88, as compared to an arrangement in which a step section has a high end part at a higher level than an adjacent region.

The gate insulating film 23 is made of SiNx (silicon nitride). The first interlayer insulating layer 25 is made of SiNx (silicon nitride) whose film thickness is approximately 0.3 µm, and the second interlayer insulting layer 26 is made of an acrylic resin whose film thickness is approximately 2.0 µm.

The thin film sections 42a in the second interlayer insulting film 26 can be easily formed based on a method such as, for example, a photolithography method that involves use of a positive type photosensitive acrylic resin. That is, by use of an exposure mask that includes a half tone region (a region where a transmission amount of an exposure UV light is adjusted) corresponding to a part where a thin film section is to be formed, a blocking region (a region through which the exposure UV light cannot transmit) corresponding to a part where a thick film section other than the thin film section is to be formed, and a transmission region (a region through which the exposure UV light can transmit) corresponding to a part where a contact hole is to be formed, an exposure process is carried out, and then, development is carried out. This allows thin film sections, thick film sections, and contact holes to be formed in the second interlayer insulating layer 26 at the same time. A contact hole is for connecting a drain extraction electrode with a pixel electrode 17, the drain extraction electrode and a drain electrode of a TFT (thin film transistor) being connected with each other.

Further, by use of the second interlayer insulating layer 26 formed as described above as a photo mask, etching is carried out to the first interlayer insulating layer 25 with a high selectivity ratio (e.g., wet etching that involves use of a chemical liquid such as a buffered fluorinated acid BHF obtained from a mixture of hydrofluoric acid. HF and ammonium fluoride $NH_4F$ and having a selectivity ratio of 10:1). This makes it possible to retain the second interlayer insulating layer 26 in a thin film section 41 while removing the first interlayer insulating layer 25 in a part where the contact hole has been formed.

FIG. 6 shows the arrangement in which thin film sections 42a are formed in the second interlayer insulating layer 26, thereby forming depressions in the active matrix substrate 3. However, the present embodiment is not limited to this. Alternatively, as in a liquid crystal display panel 10b shown in FIG. 7, depression sections can be formed in a second interlayer insulating layer 26. That is, depression sections 42b having a rectangular shape are formed in the second interlayer insulating layer 26 so that (i) each of the depression sections 42b and (ii) a black matrix 13 and a scanning signal line 16 overlap each other (see FIG. 7). This causes depressions 88 having a rectangular shape to be formed in a surface of an active matrix substrate 3 via an alignment film 9 provided above the second interlayer insulating layer 26. A step section 27 is formed by each of the depressions 88. Spacers 33 are provided in each of the depressions 88. A color filter 30, on the other hand, has a same arrangement as shown in FIG. 6.

In this case, by use of the second interlayer insulating layer 26, in which the depression sections have been formed as described, as a mask, etching is carried out to the first interlayer insulating layer 25 with a relatively low selectivity ratio (e.g., dry etching that involves use of a mixed gas of $CF_4$ and $O_2$). This makes it possible to remove the first interlayer insulating layer 25 in the part where the contact hole has been formed while removing the second interlayer insulating layer in a thin film section (i.e., while forming a depression section 42b). It should be noted that it is possible to adjust the selectivity ratio by selecting a plasma condition such as a mixing ratio of gases as appropriate.

Figure 8:
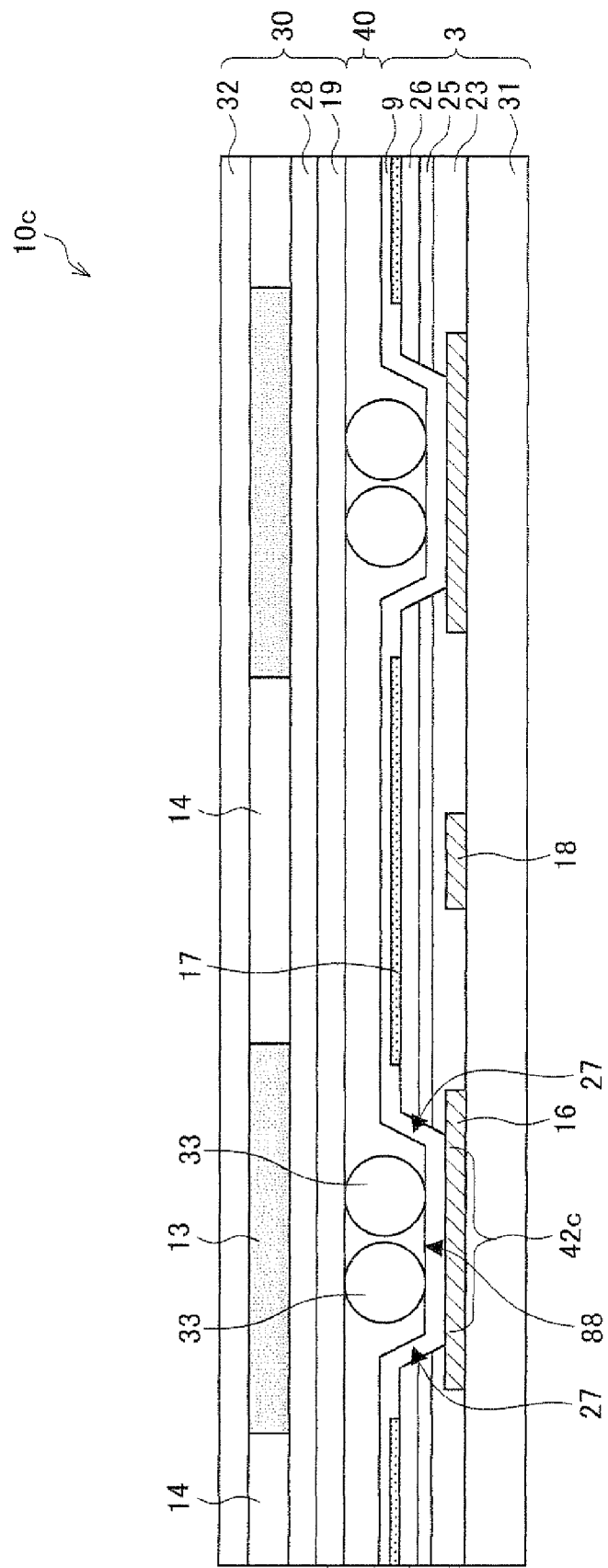
FIG. 8 is a cross sectional view showing yet another arrangement of the liquid crystal display panel in accordance with Second Embodiment.

A liquid crystal display panel of the present embodiment can be arranged as shown in FIG. 8. That is, in an active matrix substrate 3 of a liquid crystal display panel 10c, depression sections 42c having a rectangular shape are formed in each of a gate insulating film 23, a first interlayer insulating layer 25, and a second interlayer insulating layer 26 such that (i) each of the depression sections 42c and (ii) a black matrix 13 and a scanning signal line 16 overlap each other. This causes depressions 88 to be formed in a surface of the active matrix substrate 3 via an alignment film 9. A step section 27 is formed by each of the depressions 88. Spacers 33 are provided in each of the depressions 88. A color filter substrate 30, on the other hand, has a same arrangement as shown in FIG. 6.

In this case, a hole, which is to be a part of a depression section 42c and a contact hole, is formed in the second interlayer insulating layer by a photolithography method. After this, with the second interlayer insulating layer being used as a mask, an etching method such as dry etching or wet etching is carried out. This makes it possible to remove the first interlayer insulating layer while forming the depression section 42c in the first interlayer insulating layer 25 and the gate insulating film 23.

Figure 9:
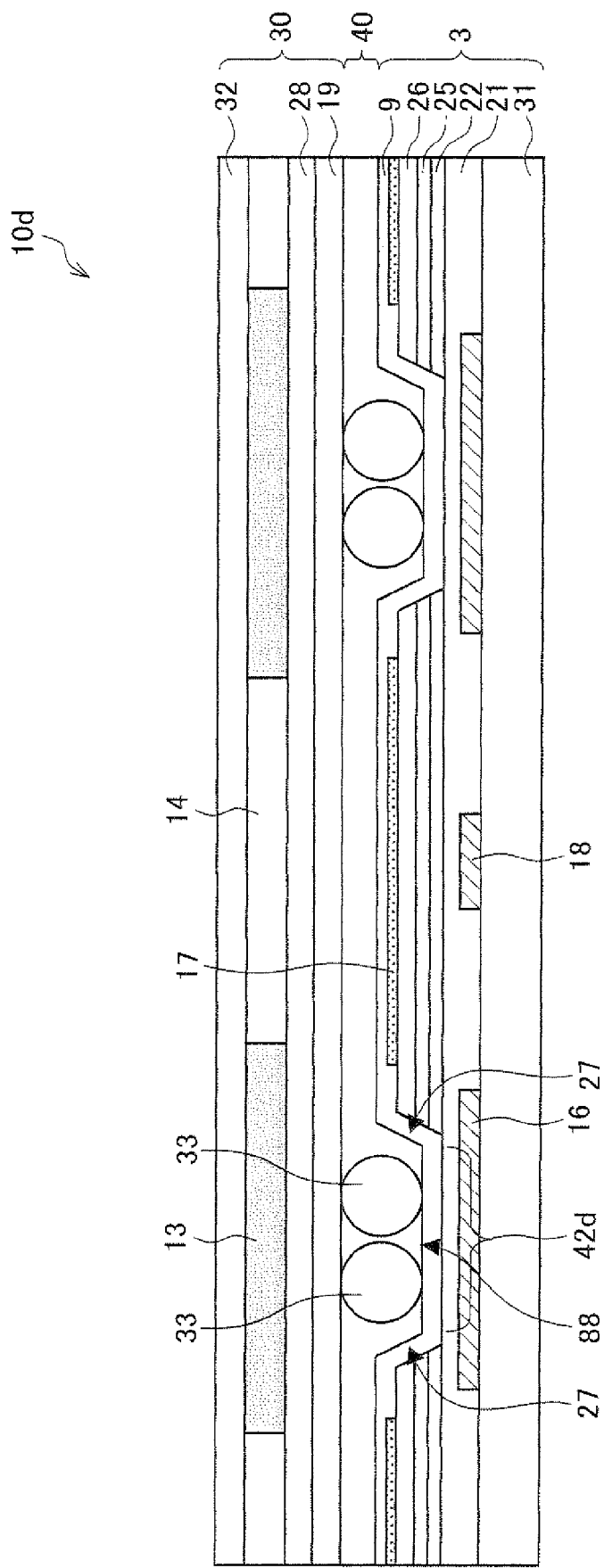
FIG. 9 is a cross sectional view showing a further arrangement of the liquid crystal display panel in accordance with Second Embodiment.

A liquid crystal display panel of the present embodiment can be arranged as shown in FIG. 9. In an active matrix substrate 3 of a liquid crystal display panel 10d shown in FIG. 9, (i) a gate insulating film has a multilayer structure including a first gate insulating layer 21 and a second gate insulating layer 22, and (ii) depression sections 42d having a rectangular shape are formed in each of the second gate insulating layer 22, a first interlayer insulating layer 25, and a second interlayer insulating layer 26 such that (a) each of the depression sections 42d and (b) a black matrix 13 and a scanning signal line 16 overlap each other. This causes depressions 88 having a rectangular shape to be formed in a surface of an active matrix substrate 30 via an alignment film 9. A step section 27 is formed by each of the depressions 88. Spacers 33 are provided in each of the depressions 88. A color filter substrate 30, on the other hand, has a same arrangement as shown in FIG. 6.

In the arrangement shown in FIG. 8, a depression is formed by boring the first interlayer insulating layer 25, the second interlayer insulating layer 26, and the gate insulating film 23, and as such, the depression can have a large depth. However, this causes the scanning signal line 16 to be exposed under the alignment film. In this case, there is a risk in that a conductive foreign matter mixed in a liquid crystal adheres to the depression, and causes a short circuit between the scanning signal line 16 and a counter electrode 28. In an arrangement shown in FIG. 9, in contrast, the first gate insulating layer 21 is provided below the alignment film 9. As such, even when such a foreign conductive matter is present, it is still possible that the first gate insulating layer 21 insulate a scanning signal line 16 from it.

The first gate insulating layer is not particularly limited in a material as long as the material has an insulation property. As such, a material containing an organic matter or a spin-on glass (SOG) material is suitably used. The SOG material is a material that can form a glass film (a silica film) when being applied by an application method such as a spin coat method or the like.

Among SOG materials, a spin-on glass material (so called an organic SOG material) containing an organic element, for example, is more suitably used. Suitably usable examples of the organic SOG material include, in particular, an SOG material containing a Si—O—C bond and an SOG material containing a Si—C bond. The organic SOG material has a low relative permitivity. Besides, it is possible to form a thick film out of the organic SOG material with ease. As such, with use of the organic SOG material, it is possible to form a thick first gate insulating layer 21 while making its relative permitivity low and thereby to achieve planarization. In the present embodiment, the first gate insulating layer 21 has a film thickness falling in a range of approximately 1.5 μm to 2.0 μm. The material containing an organic matter includes, besides the SOG material, an acrylic resin, an epoxy resin, a polyimide resin, a polyurethane resin, a polysiloxane resin, and the like.

Examples of the SOG material containing the Si—O—C bond may include a material disclosed in Japanese Patent Application Publication, Tokukai, No. 2001-98224, a material disclosed in Japanese Patent Application Publication, Tokukaihei, No. 6-240455, and DD1100 manufactured by the Dow Corning Toray Silicone Co., Ltd., which DD1100 is disclosed on page 617 of the proceedings from the IDW'03. On the other hand, an example of the SOG material containing the Si—C bond may include a material disclosed in Japanese Patent Application Publication, Tokukaihei, No. 10-102003.

A first gate insulating layer can be made of an organic SOC material containing a silica filler. In this case, it is preferable that the silica filler be dispersed in a base material made from the organic SOG material. This makes it possible to form a first gate insulating layer 21 without causing a crack, even in a case where a substrate is manufactured in a large size. The silica filler has a grain diameter in a range of, for example, 10 nm to 30 nm. The organic SOG material contains the silica filler in a mixing ratio falling in a range of, for example, 20 volume % to 80 volume %. A usable example of the organic SOG material containing the silica filler includes LNT-025 manufactured by the Catalysts and Chemicals Co., Ltd.

Figure 10:
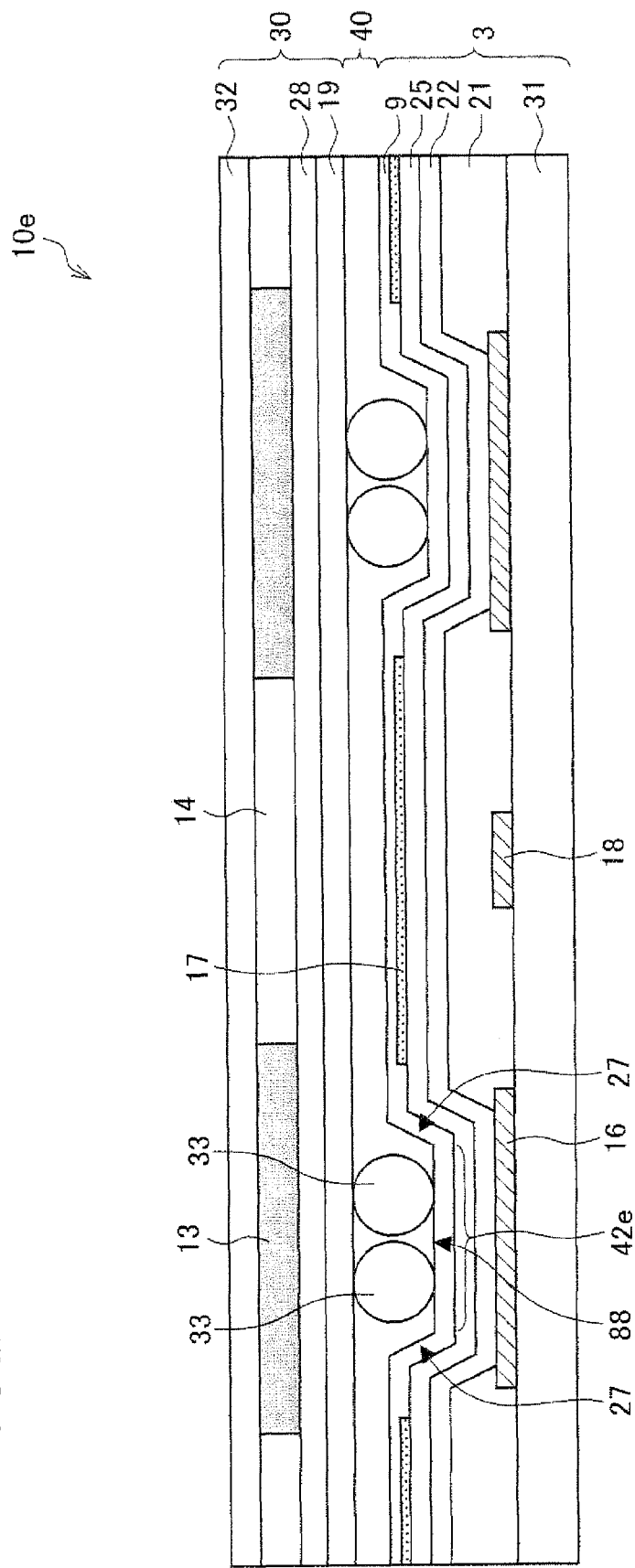
FIG. 10 is a cross sectional view showing still another arrangement of the liquid crystal display panel in accordance with Second Embodiment.

A liquid crystal panel of the present embodiment can be arranged as shown in FIG. 10. In an active matrix substrate 3 of a liquid crystal display panel 10e shown in FIG. 10, (i) a gate insulating film has a multilayer structure including a first gate insulating layer 21 and a second gate insulating layer 22, and (ii) depression sections 42e having a rectangular shape are formed in the first gate insulating layer 21 such that (a) each of the depression sections 42e and (b) a black matrix 13 and a scanning signal line 16 overlap each other. This causes depressions 88 having a rectangular shape to be formed in a surface of the active matrix substrate 3 via the second gate insulating layer 22, a first interlayer insulating layer 25, and an alignment film 9. A step section 27 is provided by each of the depressions 88. Spacers 33 are provided in each of the depressions 88. A color filter substrate, on the other hand, has a same arrangement as shown in FIG. 6.

The first gate insulating layer 21 is made of an SOG material. However, as described above, a first gate insulating layer 21 can alternatively be made of a material containing an organic matter, an acrylic resin material, an epoxy resin, a polyimide resin, a polyurethane resin, a polysiloxane material, or the like.

In the arrangement, a material such as an SOG material or the like is applied by a spin coat method so as to cover a retention capacitor wire 18 and a scanning signal line 16, such that a planarized film to serve as the first gate insulating layer is formed. After this, with use of a photo mask formed of a photo resist applied on the first gate insulating layer, exposure is carried out, and then, development is carried out. Subsequently, dry etching is carried out. This causes the depression sections 42e to be formed in the first gate insulating layer. For the dry etching, a mixed gas of a hydrogen tetrafluoride ($CF_4$) and an oxygen ($O_2$), for example, should be used.

Third Embodiment

Figure 11:
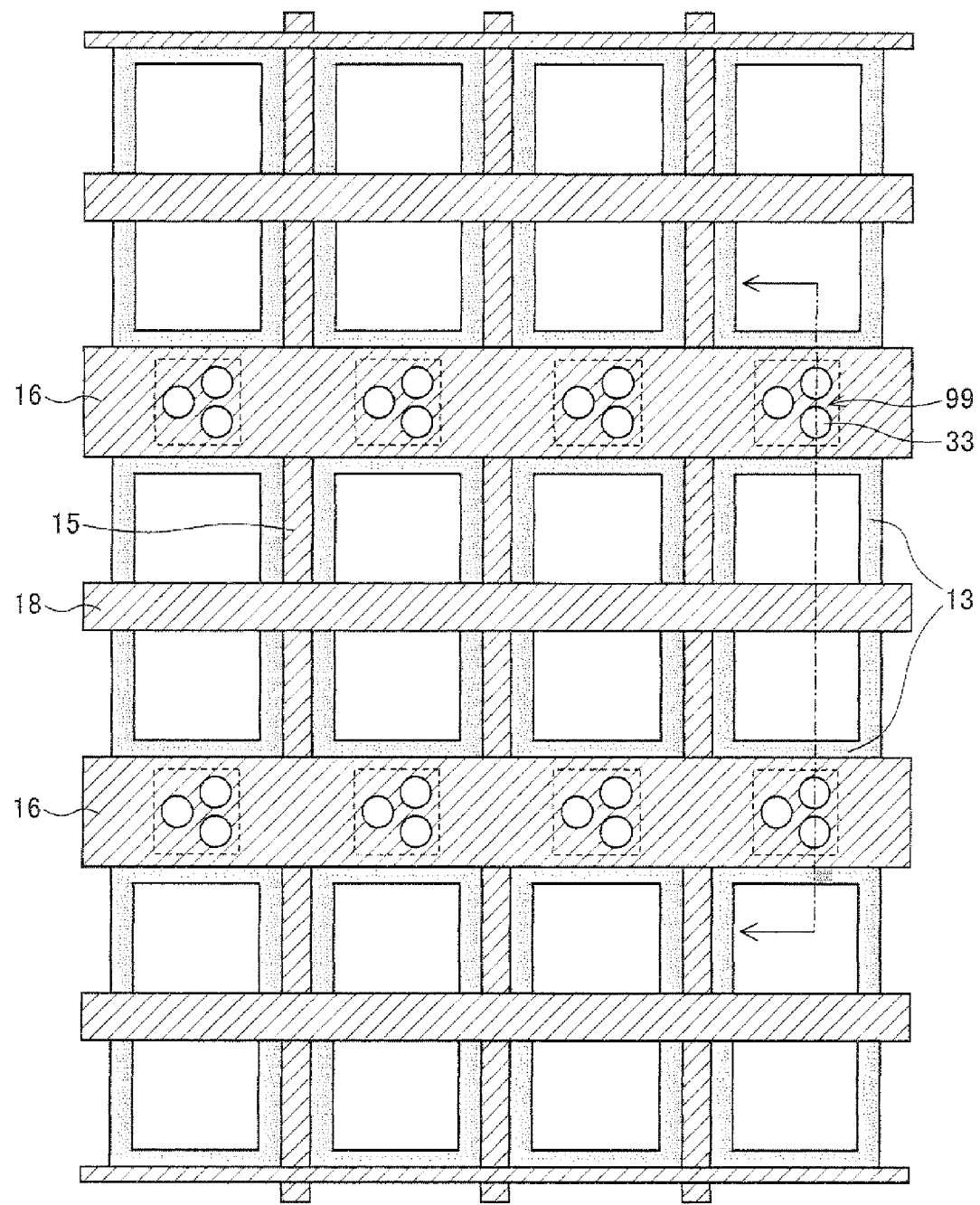
FIG. 11 is a plane view showing an arrangement of a liquid crystal display panel in accordance with Third Embodiment.
Figure 12:
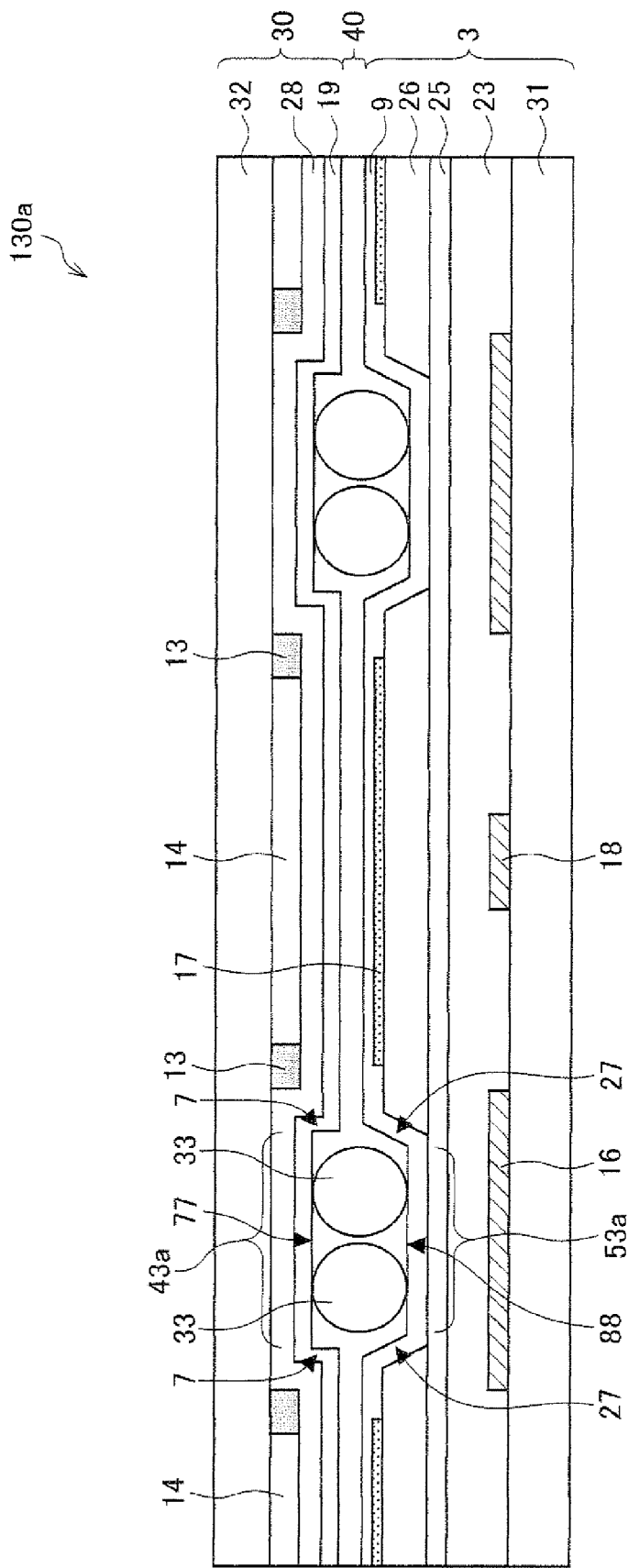
FIG. 12 is a cross sectional view showing the arrangement of the liquid crystal display panel in accordance with Third Embodiment.

FIG. 11 is a plane view showing a part of a liquid crystal display panel in accordance with the present embodiment, and FIG. 12 is a cross sectional view taken on arrows in FIG. 11. In the liquid crystal display panel of the present embodiment, a plurality of spaces 99, in each of which spacers 33 are disposed, is formed at intervals above a scanning signal line 16 (see FIG. 11). Otherwise, the liquid crystal display panel of the present embodiment has a same arrangement as shown in FIG. 1.

As shown in FIG. 12, a liquid crystal display panel 130a includes an active matrix substrate 3, a color filter substrate 30, spacers 33 provided between the active matrix substrate 3 and the color filter substrate 30, and a liquid crystal material 40 sealed in a space formed by the substrates (the active matrix substrates 3 and the color filter substrate 30) and a seal (which is not illustrated) provided on external surfaces of the liquid crystal display panel 130a (see FIG. 12).

The active matrix substrate 3 includes a transparent substrate 31, scanning lines 16, retention capacitor lines 18, a gate insulating film 23, TFTs (which are not illustrated), a first interlayer insulting layer 25, a second interlayer insulating layer 26, pixel electrodes 17, and an alignment film 9. On the transparent substrate 31, the scanning signal lines 16 and the retention capacitor wires 18 are provided. The gate insulating film 23 is provided on the scanning signal lines 16 and the retention capacitor lines 18. On the gate insulating film 23, members such as a semiconductor layer (which is not illustrated) forming a channel of a transistor, data signal lines (which are not illustrated), electrodes of a TFT (which are not illustrated), and drain extraction electrodes (which are not illustrated) are provided. The first interlayer insulating layer 25 and the second interlayer insulating layer 26 are provided on and above such wires and electrodes. Each of the pixel electrodes 17, which are made of ITO, is provided on that part of the second interlayer insulating layer 26 which corresponds to a pixel region. The alignment film 9 is provided so as to cover the pixel electrodes 17. It should be noted that the drawings do not show an embossment or the like formed in a part where the gate insulting film 23 and a member such as the scanning signal lines 16 overlap each other.

The color filter substrate 30, on the other hand, includes a transparent substrate 32, a black matrix 13, colored layers 14 (R, G, and B), a transparent counter electrode (a common electrode) 28, and an alignment film 19. On the transparent substrate 32, the black matrix 13 and the colored layers 14 are provided. The counter electrode 28 is provided so as to cover the black matrix 13 and the colored layers 14. The alignment film 19 is provided on the counter electrode 28. The colored layers 14 of R, G, and B are regularly arranged for a pixel region. The black matrix 13 is provided in a gap formed by the colored layers 14 of R, G, and B.

In the second interlayer insulating layer 26 of the active matrix substrate 3, depression sections 53a having a rectangular shape are formed such that (i) each of the depression sections 53a and (ii) the black matrix 13 and a scanning signal line 16 overlap each other (see FIG. 12). This causes depressions 88 having a rectangular shape to be formed in a surface of the active matrix substrate 3 via the alignment film 9 provided above the second interlayer insulting layer 26. A step section 27 is formed by each of the depressions 88. In the black matrix 13 of the color substrate 30, on the other hand, depression sections 43a having a rectangular shape are formed so that each of the depression sections 43a and the scanning signal line 16 overlap each other. This causes depressions 77 having a rectangular shape to be formed in a surface of the color filter substrate 30 via the alignment film 19 provided above the black matrix 13. A step section 7 is formed by each of the depressions 77. The depressions 77 and 88 are arranged such that their recessive parts face each other, respectively, thereby forming spaces (spaces 99 shown in FIG. 11) in each of which spacers are to be disposed. The spacers 33 are provided in each of the spaces 99.

In the liquid crystal display panel 130a, the spacers 33 are disposed in each space formed by the depression sections 77 and 88, and as such, movements of the spacers 33 are restricted by the step sections 7 and 8. This makes it possible to keep the movements of the spacers 33 fairly minimum even when the spacers 33 move due to shaking of or a shock to the liquid crystal display panel 130a. This in turn makes it possible to improve evenness of a cell gap. An effect so obtained is particularly remarkable in a large-size liquid crystal display panel that may be easily deflected by a shake or a shock (i.e., a liquid crystal display panel in which spacers may easily move).

In the liquid crystal display panel 130a, the step section 7 has its high end part at substantially a same level as an adjacent region. This brings about another effect that makes it easier to provide the alignment film 19 under each of the depressions 77, as compared to an arrangement in which a step section has its high end part at higher level than an adjacent region. Likewise, the step section 27 has its high end part at substantially a same level as an adjacent region. This brings about an effect that makes it easier to provide the alignment film 9 under each of the depressions 88.

Figure 13:
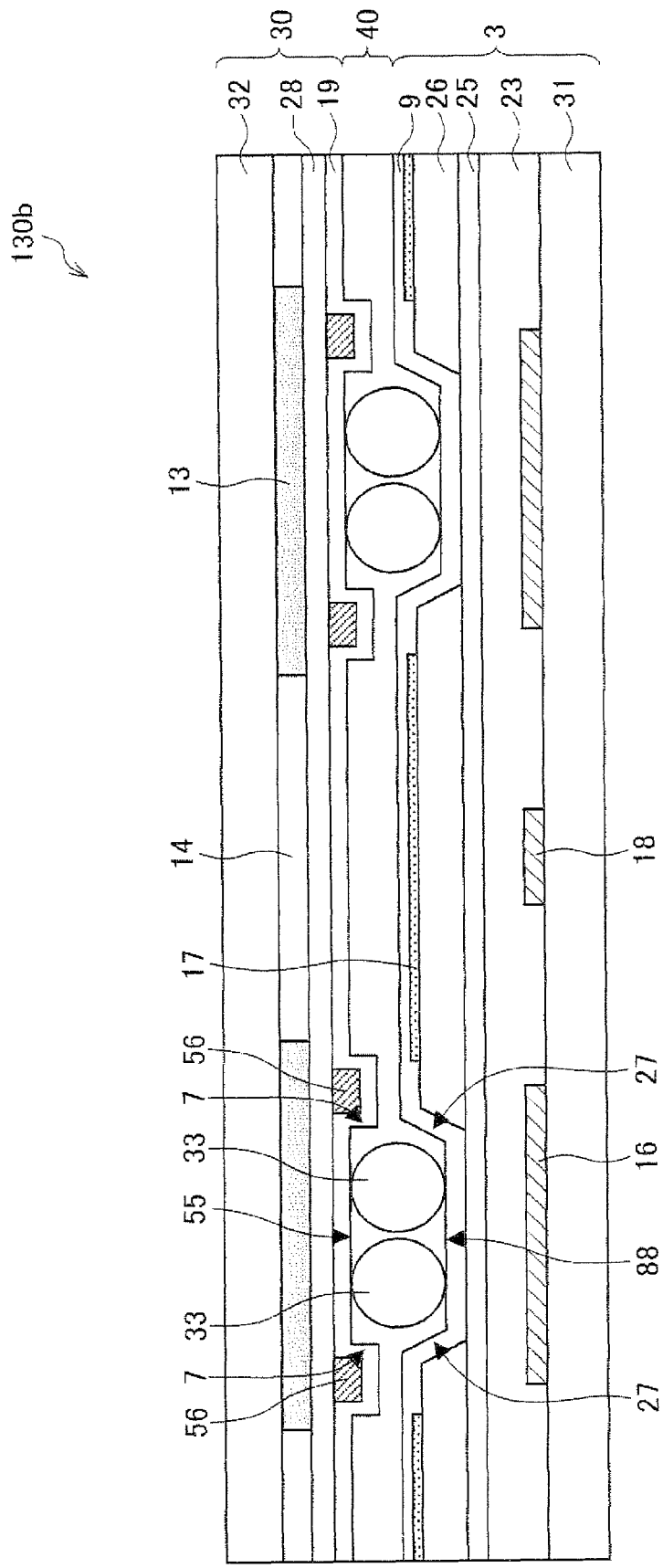
FIG. 13 is a cross sectional view showing another arrangement of the liquid crystal display panel in accordance with Third Embodiment.

Alternatively, the liquid crystal display panel of the present embodiment can be arranged as shown in FIG. 13. That is, a color filter substrate 30 of a liquid crystal display panel 130b includes a transparent substrate 32, a black matrix 13, colored layers 14 (R, G, and B), a counter electrode (a common electrode) 28, protrusion sections 56, and an alignment film 19. On the transparent substrate 32, the black matrix 13 and the colored layers 14 are provided. The counter electrode 28 is provided so as to cover the black matrix 13 and the colored layers 14. Each of the protrusion sections 56 having a rectangular edge shape is provided on a part of the counter electrode 28. The alignment film 19 is provided so as to cover the counter electrode 28 and the protrusion sections 56. This causes step sections 7 and seats 55, each of which seats 55 has a rectangular shape and is surrounded by a step section 7, to be formed in a surface of the color filter 30 via the alignment film 19 provided above the protrusion section 56. An active matrix substrate 3, on the other hand, has a same arrangement as shown in FIG. 12. A step section 7, a seat 55, and a depression 88 are arranged together so as to form a space (a space 99 shown in FIG. 11) in which spacers 33 are to be provided. Then, the spacers 33 are provided in the space. The protrusion section 56 can be formed together with, for example, an alignment controlling rib that is provided in the color filter substrate 30.

Figure 14:
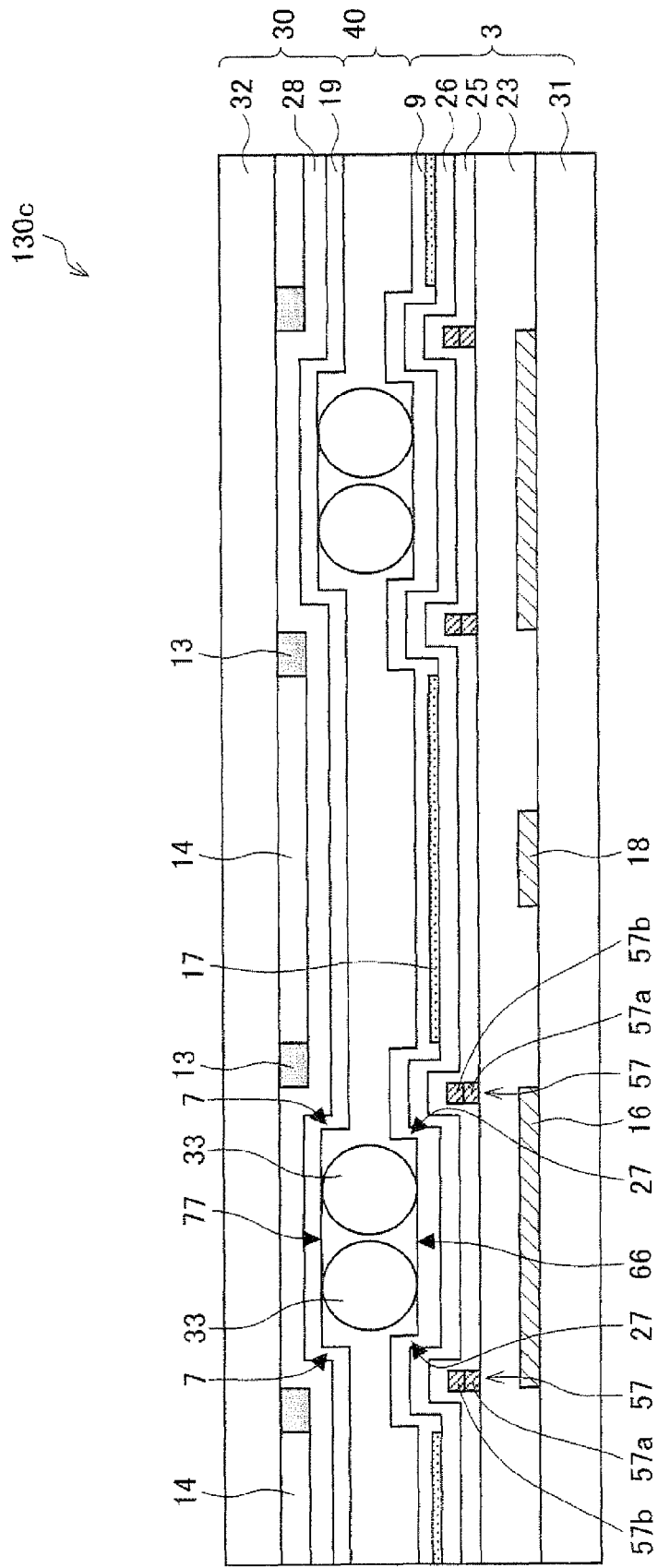
FIG. 14 is a cross sectional view showing yet another arrangement of the liquid crystal display panel in accordance with Third Embodiment.

Further, the liquid crystal display panel of the present embodiment can alternatively be arranged as shown in FIG. 14. That is, an active matrix substrate 3 of a liquid crystal display panel 130c includes a transparent substrate 3, scanning signal lines 16, retention capacitor wires 18, a gate insulating film 23, TFTs (which are not illustrated), a first interlayer insulating layer 25, protrusion sections 66, a second interlayer insulating layer 26, pixel electrodes 17, and an alignment film 9. On the transparent substrate 31, the scanning signal lines 16 and the retention capacitor wires 18 are provided. The gate insulating film 23 is provided on the scanning signal lines 16 and the retention capacitor wires 18. On the gate insulating film 23, the protrusion sections 57 having a rectangular edge shape and members such as a semiconductor layer (which is not illustrated) forming a channel of a transistor, data signal lines (which are not illustrated), electrodes of the transistor (which are not illustrated), and drain extraction electrodes (which are not illustrated) are provided. Each of the protrusion section 57 includes a semiconductor section 57a provided in a same layer as a semiconductor forming the channel of the transistor, and a semiconductor section 57b provided in a same layer as a conductive material layer forming the data signal lines. The first interlayer insulating layer 25 is provided so as to cover the protrusion sections 57, the electrodes, the data signal lines, and the like. The second interlayer insulating layer 26 is provided above the first interlayer insulating layer 25. Each of the pixel electrodes 17, which are made of ITO, is provided on that part of the second interlayer insulating layer 26 which corresponds to a pixel region. The alignment film 9 is provided so as to cover the pixel electrodes 17. It should be noted that the drawings do not show an embossment or the like formed in a part where the gate insulating film 23 and a member such as the scanning signal lines 16 overlap each other.

Step sections 27 having rectangular shape and seats 66, each of which seats 66 is surrounded by a step section 27, are thus formed in a surface of the active matrix substrate 3 via (i) the first interlayer insulating layer 25 and the second interlayer insulating layer 26 provided on and above the protrusion sections 56 and (ii) the alignment film 9. A color filter substrate 30, on the other hand, has a same arrangement as shown in FIG. 12. A step section 27, a seat 66, and a depression 77 are arranged together so as to form a space (a space 99 shown in FIG. 11) in which spacers 33 are to be provided. Then, the spacers 33 are provided in the space.

Figure 26:
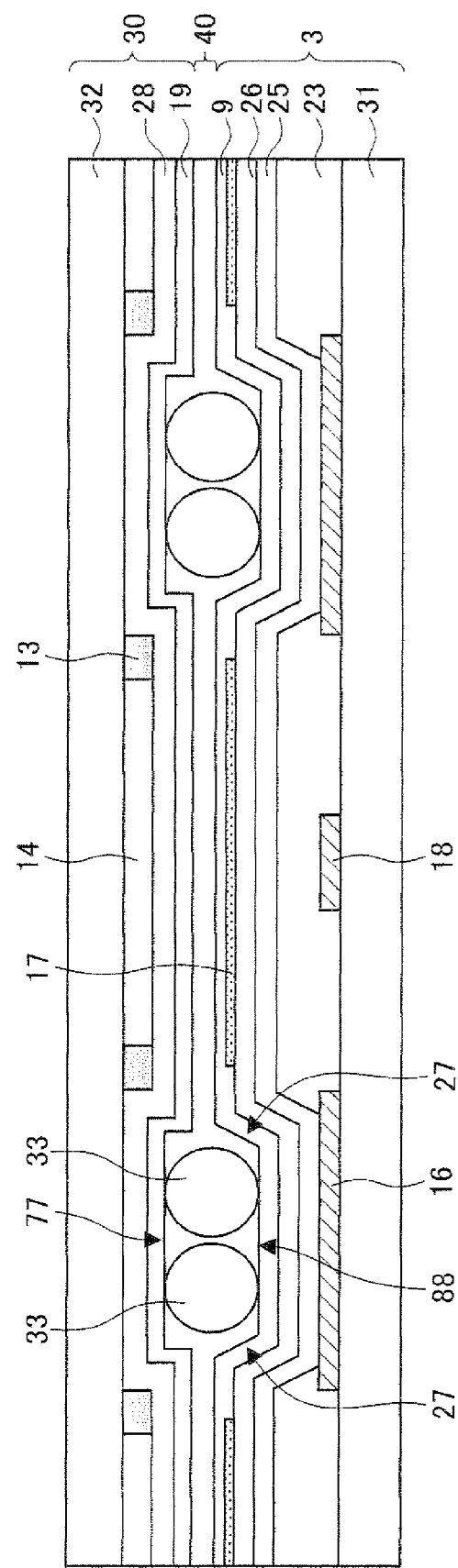
FIG. 26 is a cross sectional view showing a further arrangement of the liquid crystal display panel in accordance with Third Embodiment.
Figure 27:
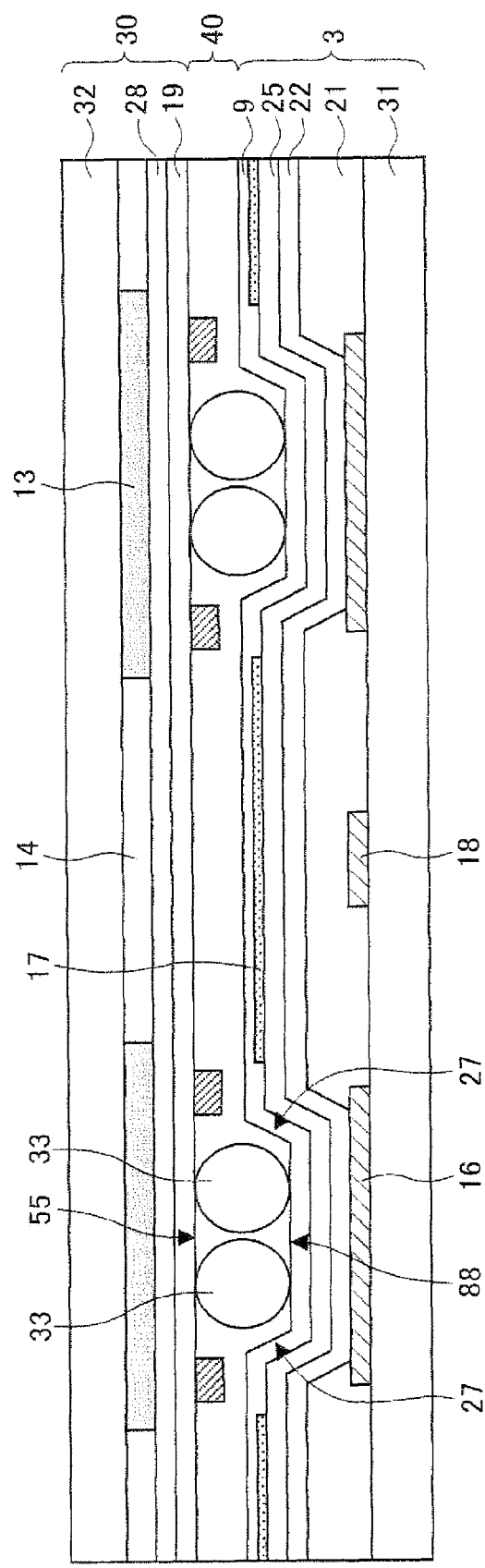
FIG. 27 is a cross sectional view showing a still further arrangement of the liquid crystal display panel in accordance with Third Embodiment.

A color filter substrate 30 shown in FIG. 12 and an active matrix substrate 3 shown in FIG. 10 can be combined to each other so as to constitute a liquid crystal display panel as shown in FIG. 26. Alternatively, a color filter substrate 30 shown in FIG. 13 and an active matrix substrate 3 shown in FIG. 10 can be combined to each other so as to constitute a liquid crystal display panel as shown in FIG. 27.

Fourth Embodiment

Figure 15:
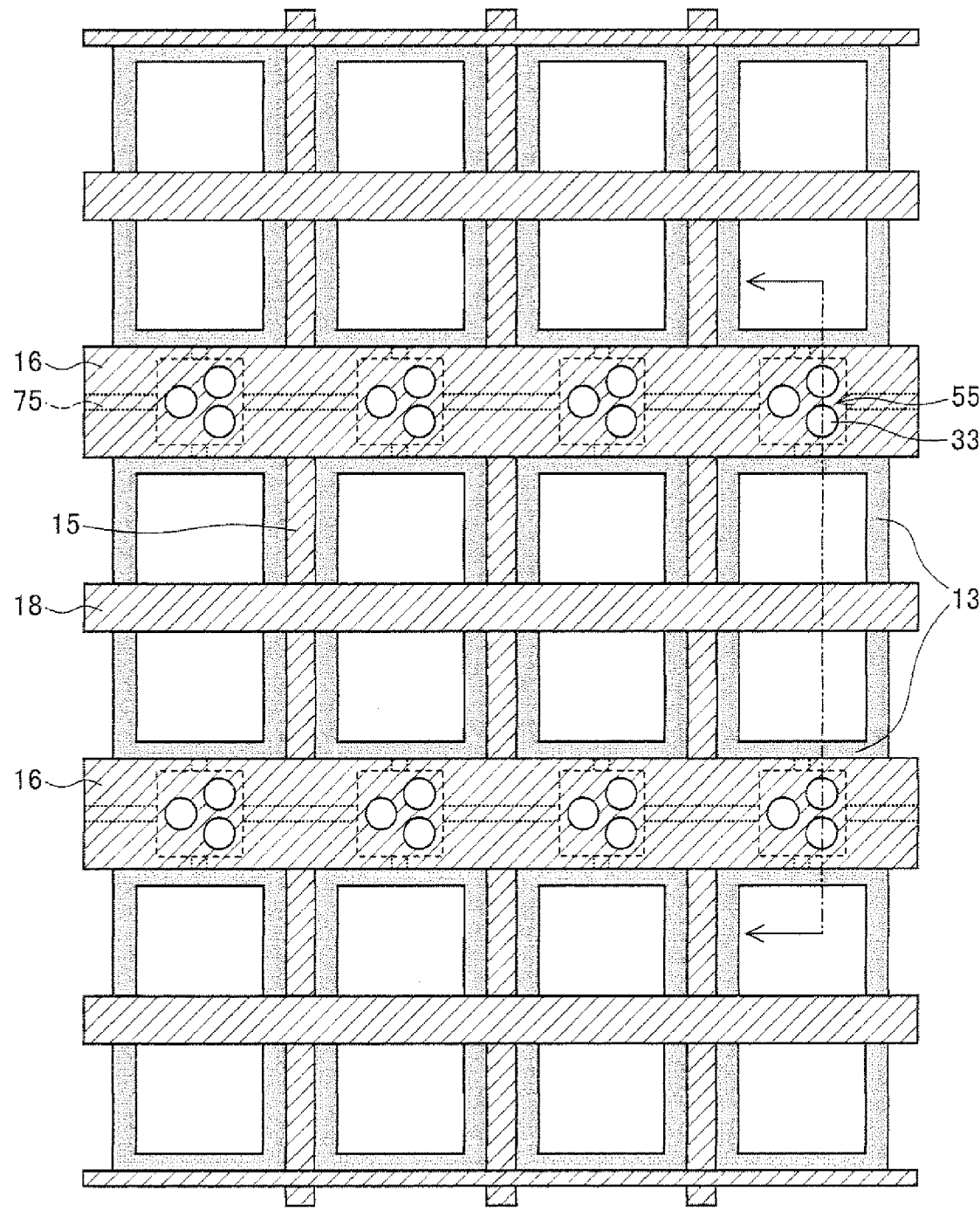
FIG. 15 is a plane view showing an arrangement of a liquid crystal display panel in accordance with Fourth Embodiment.
Figure 16:
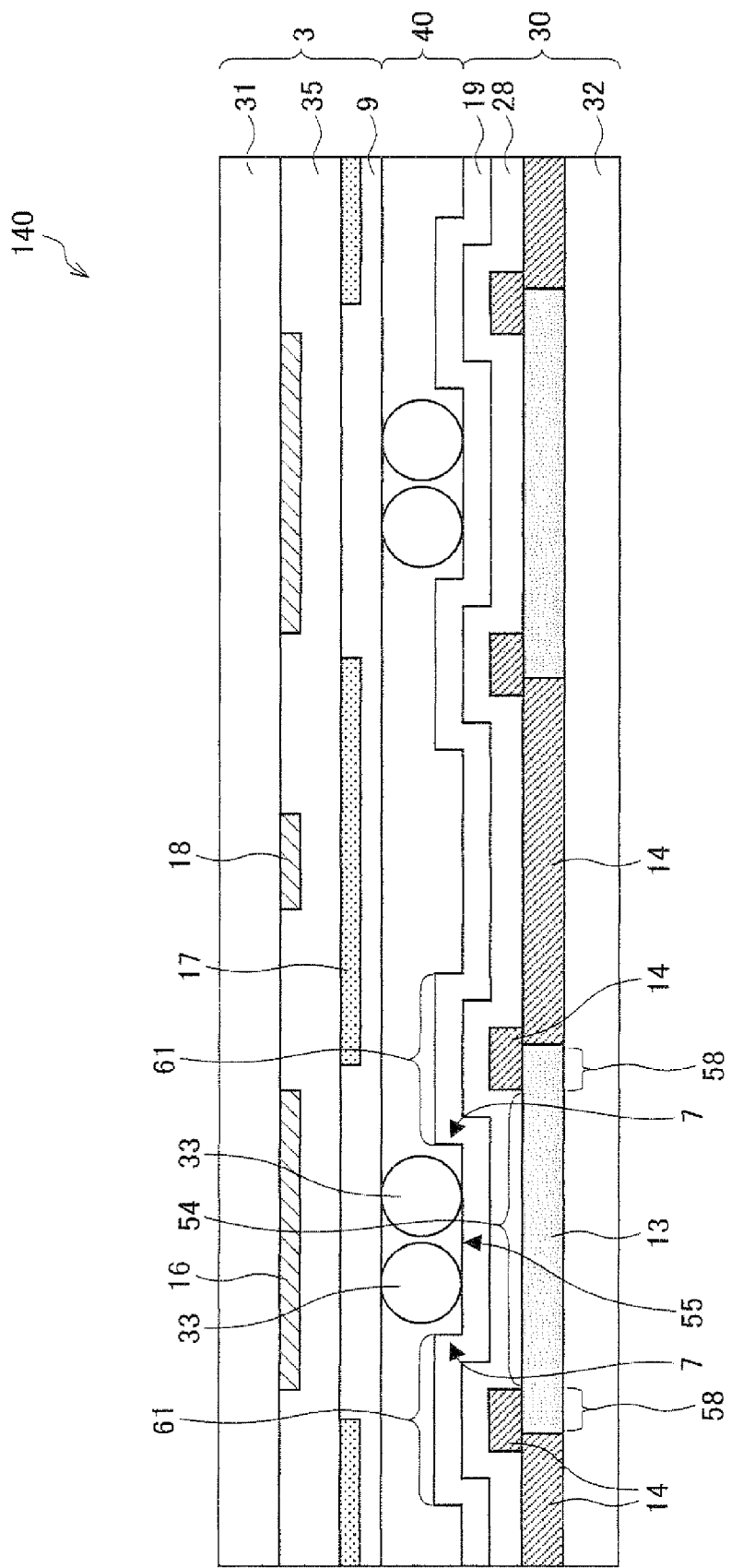
FIG. 16 is a cross sectional view showing the arrangement of the liquid crystal display panel in accordance with Fourth Embodiment.
Figure 17:
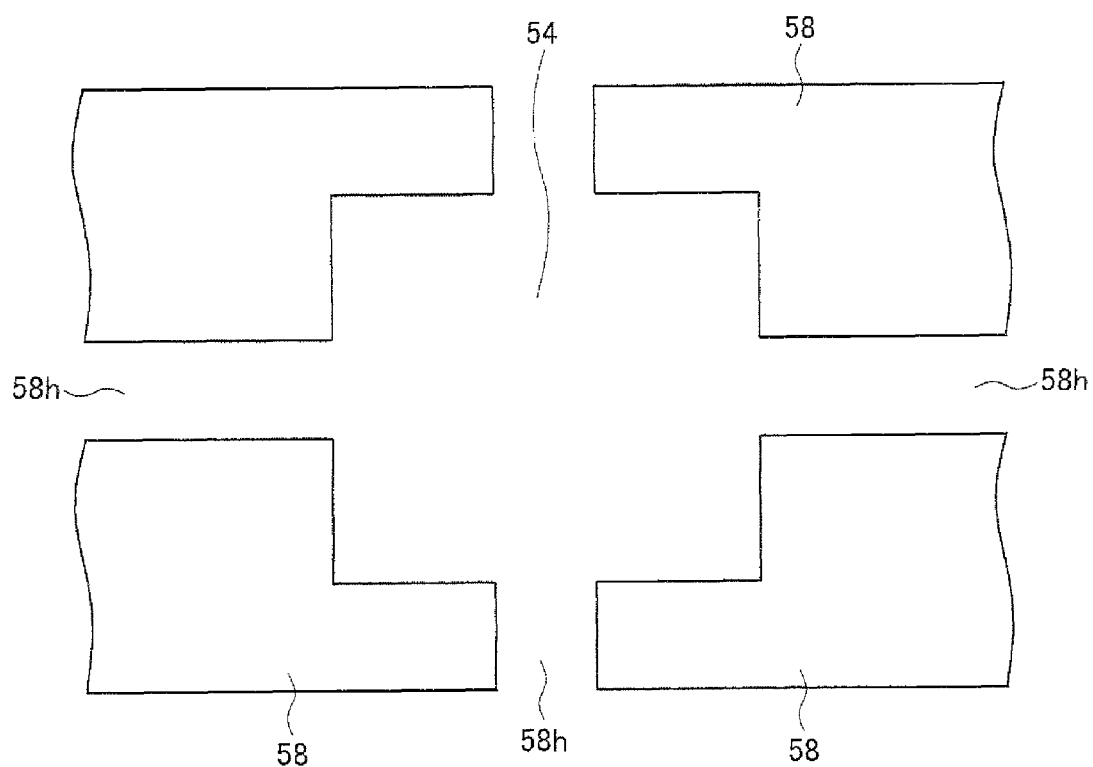
FIG. 17 is a cross sectional view showing a partial arrangement of the liquid crystal display panel shown in FIG. 16.

FIG. 15 is a plane view showing a part of a liquid crystal display panel of the present embodiment, and FIG. 16 is a cross sectional view taken on arrows in FIG. 15. In the liquid crystal display panel of the present embodiment, pluralities of step sections 7 for surrounding spacers 33 and seats 55 are provided at intervals below a scanning signal line 16 (see FIG. 15).

As shown in FIG. 16, a liquid crystal display panel 140 includes an active matrix substrate 3, a color filter substrate 30, spacers 33 provided between the active matrix substrate 3 and the color filter substrate 30, and a liquid crystal material 40 sealed in a space formed by the substrates (the active matrix substrate 3 and the color filter substrate 30) and a seal (which is not illustrated) provided on external surfaces of the liquid crystal display panel 140.

The active matrix substrate 3 includes a transparent substrate 31, scanning signal lines 16, retention capacitor wires 18, an insulating layer 35 including a gate insulating film and an interlayer insulating film, TFTs (which are not illustrated), pixel electrodes 17, and an alignment film 9. On the transparent substrate 31, the scanning signal lines 16 and the retention capacitor wires 18 are provided. The gate insulating film is provided on the scanning signal lines 16 and the retention capacitor wires 18. On the gate insulating film, members such as a semiconductor layer (which is not illustrated) forming a channel of a transistor, data signal lines (which are not illustrated), electrodes of the transistor (which are not illustrated), and drain extraction electrodes (which are not illustrated) are formed. The interlayer insulating film is provided above such wires and electrodes. Each of the pixel electrodes 17, which are made from ITO, is provided in that part of the interlayer insulating film which corresponds to a pixel region. The alignment film 9 is provided so as to cover the pixel electrodes 17. It should be noted that the drawings do not show an embossment or the like formed in a part where the insulating film 35 and a member such as the scanning signal lines 16 overlap each other.

The color filter substrate 30, on the other hand, includes a transparent substrate 32, a black matrix 13, colored layers 14 (R, G, and B), a transparent counter electrode (a common electrode) 28, and an alignment film 19. On the transparent substrate 32, the black matrix 13 and the colored layers 14 are provided. The counter electrode 28 is provided so as to cover the black matrix 13 and the colored layers 14. The alignment film 19 is provided on the counter electrode 28. The colored layers 14 of R, G, and B are regularly arranged for a pixel region. The black matrix 13 is provided in a gap formed by the colored layers 14.

As shown in FIG. 16, an edge part of each colored layer and the black matrix 13 overlap each other. An overlapping part 58 of the black matrix 13 and each colored layer 14 is formed so as to surround a plane part 54 (a region in which only the black matrix 13 is provided) that is formed below (or above) a scanning signal line 16 (see FIGS. 16 and 17). This causes a step section 7 and a seat 55 surrounded by the step section 7 to be formed in a surface of the color filter substrate 30 via the counter electrode 28 and the alignment film 19. Spacers 33 are provided in the seat 55. In the liquid crystal display panel of the present embodiment, a non-overlapping section 58*h* is formed so as to extend in four directions (longitudinal and transverse directions of the drawings) from the plane part 54, and formation of the non-overlapping section 58*h* forms a ditch 75 that has substantially a same depth as a step of the step section 7 and extends in the four directions (longitudinal and transverse directions of the drawings) from the seat 55 (see FIGS. 15 and 17). The non-overlapping section 58*h* and the ditch 75 are formed in order that the alignment film can be provided under the seat 55 with ease.

In the liquid crystal display panel 140 of the present embodiment, the spacers 33 are provided in the seat 55, and as such, their movements are restricted by the step section 7. This makes it possible to keep the movements of the spacers 33 fairly minimum even when the spacers 33 move due to shaking of or a shock to the liquid crystal display panel 140. This in turn makes it possible to improve evenness of a cell gap. An effect so obtained is particularly remarkable in a large-size liquid crystal display panel that may be easily deflected by a shake or a shock (i.e., a liquid crystal display panel in which spacers may easily move).

Fifth Embodiment

Figure 18:
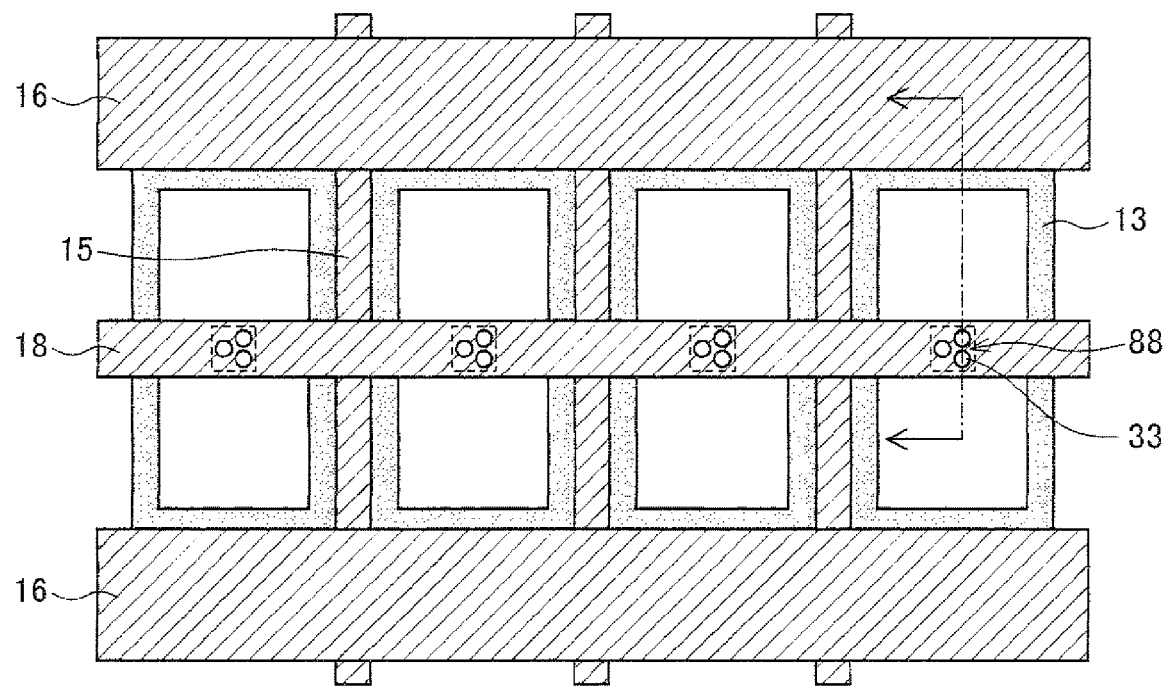
FIG. 18 is a plane view showing an arrangement of a liquid crystal display panel in accordance with Fifth Embodiment.
Figure 19:
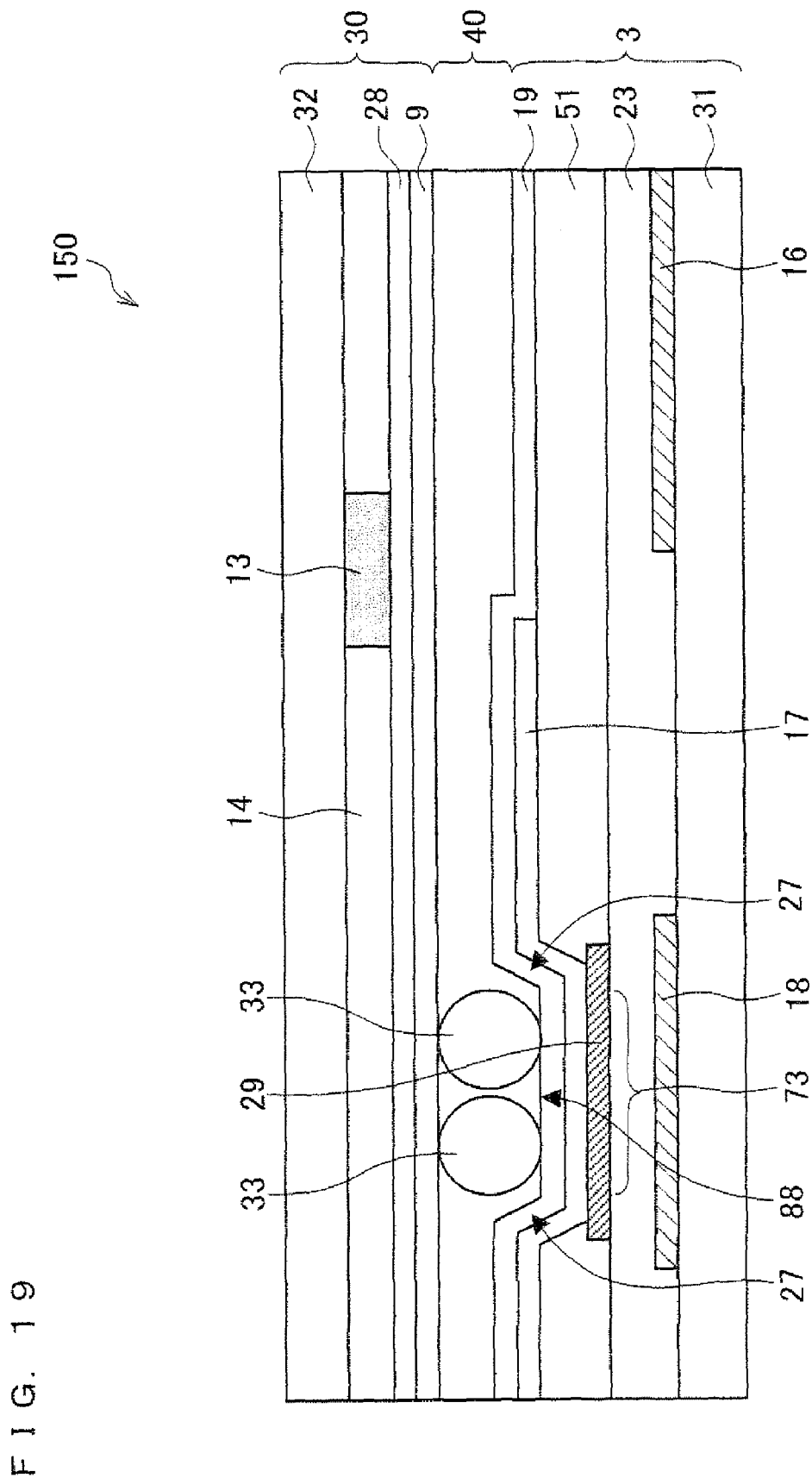
FIG. 19 is a cross sectional view showing the arrangement of the liquid crystal display panel in accordance with Fifth Embodiment.

FIG. 18 is a plane view showing a part of a liquid crystal display panel of the present embodiment, and FIG. 19 is a cross sectional view taken on arrows in FIG. 18. In the liquid crystal display panel of the present embodiment, pluralities of step sections 27 for surrounding spacers 33 and depressions 88 are provided at intervals above a retention capacitor line 18 (see FIG. 18).

As shown in FIG. 19, a liquid crystal display panel 150 includes an active matrix substrate 3, a color filter substrate 30, spacers 33 provided between the active matrix substrate 3 and the color filter substrate 30, and a liquid crystal material 40 sealed in a space formed by the substrates (the active matrix substrate 3 and the color filter substrate 30) and a seal (which is not illustrated) provided on external surfaces of the liquid crystal display panel 150.

The active matrix substrate 3 includes a transparent substrate 31, scanning signal lines 16, retention capacitor wires 18, a gate insulating film 23, TFTs (which are not illustrated), an interlayer insulating film 51, pixel electrodes 17, and an alignment film 19. On the transparent substrate 31, the scanning signal lines 16 and the retention capacitor wires 18 are provided. The gate insulating film 23 is provided on the scanning signal lines 16 and the retention capacitor wires 18. On the gate insulating film 23, members such as a semiconductor layer (which is not illustrated) forming a channel of a transistor, data signal lines (which are not illustrated), electrodes of the transistor (which are not illustrated), and drain extraction electrodes 29 are provided. The interlayer insulating film 51 is provided above such wires and electrodes. Each of the pixel electrodes 17, which are made of ITO, is provided on that part of the interlayer insulating film 51 which corresponds to a pixel region. It should be noted that the drawings do not show an embossment or the like formed in a part where the gate insulating film 23 and a member such as the scanning signal lines 16 overlap each other.

The color filter substrate 30, on the other hand, includes a transparent substrate 32, a black matrix 13, colored layers 14 (R, G, and B), a transparent counter electrode 28, and an alignment film 19. On the transparent substrate 32, the black matrix 13 and the colored layers 14 are provided. The counter electrode 28 is provided so as to cover the black matrix 13 and the colored layers 14. The alignment film 19 is provided on the counter electrode 28. The colored layers 14 of R, G, and B are regularly arranged for a pixel region. The black matrix 13 is provided in a gap formed by adjacent colored layers 14.

As shown in FIG. 19, depression sections 73 having a rectangular shape are formed in the interlayer insulating film 51, each of which depression sections 73 is to be a part of a contact hole. This causes each of the pixel electrodes 17 to be connected with a drain extraction electrode 29, and causes depressions 88 having a rectangular shape to be formed in a surface of the active matrix substrate 3. A step section 27 is formed by each of the depressions 88. The spacers 33 are provided in each of the depression 88.

In the liquid crystal display panel 150, the spacers 33 are provided in each of the depressions 88, and as such, their movements are restricted by the step section 27. This makes it possible to keep the movements of the spacers 33 fairly minimum even when the spacers 33 move due to shaking of or a shock to the liquid crystal display panel 150. This in turn makes it possible to improve evenness of a cell gap. Such an effect is particularly remarkable in a large-size liquid crystal display panel that may be easily deflected by a shake or a shock (i.e., a liquid crystal display panel in which spacers may easily move).

Besides, the present embodiment brings about another effect that eliminates the work for individually forming a depression 88, because formation of the contact hole for connecting the pixel electrode 17 with the drain extraction electrode 29 causes the depression 88 to be formed.

In the liquid crystal display panel 150, the step section 27 has its high end part at substantially a same level as an adjacent region. This brings about still another effect that makes it easier to provide an alignment film under the depression 88, as compared to an arrangement in which a step section has its high end part at a higher level than an adjacent region.

The following description deals with a method for manufacturing a liquid crystal display panel of the color filter substrate and the active matrix substrate above.

First, spacers are provided, by an ink jet method, in a depression formed in a surface of the color filter substrate. A patent literature such as Japanese Patent Application Publication, Tokukaisho, No. 57-58124, discloses a method for providing spacers in a fixed position by an ink jet method.

Specifically, according to the method disclosed in the above patent literature, liquid droplets such as isopropyl alcohol containing spacers or the like are sprayed by an ink jet application device so as to be disposed in a depression. The spacers are spherical particles (a diameter of approximately 3 μm), made of a synthetic resin, whose surfaces are coated with an adhesive agent. Subsequently, an ink (the liquid droplet) is dehydrated, and dehydration of the ink causes the spacers to be fixed in the depression by the adhesive agent on their surfaces. It is preferable that the adhesive agent be thermoset. In this case, one substrate, to which the spacers have been applied, is heated before two substrates are combined to each other so that the spacers are fixed to the substrate.

The liquid crystal can be sealed by a vacuum infusion method, which includes steps of: providing, in a part of a periphery of a substrate, an inlet which is made from a thermoset seal resin and via which a liquid crystal is introduced; immersing the inlet in the liquid crystal under vacuum and then carrying out exposure to an atmospheric pressure, so that the liquid crystal is introduced via the inlet; and sealing the inlet with a material such as a UV cured resin. Alternatively, the liquid crystal can be sealed by a one drop filing process as described below.

Specifically, according to the one drop filing process, a UV cured seal resin is applied on that surface of a color filter substrate which faces an active matrix substrate, and it is arranged so that a most suitable amount of a liquid crystal regularly falls in drops into a space formed by the seal and the color filter substrate. The amount of the liquid crystal to fall in drops is determined based on a cell gap value and a capacitance value to be filled with the liquid crystal.

Further, in order to combine the active matrix substrate and the color filter substrate to each other, to which color filter substrate seal patterning and instillation of the liquid crystal have been carried out as described above, an inner atmosphere of a combining device is lowered to 1 Pa, and then, those substrates are combined to each other under the lowered inner atmosphere. After the color filter substrate and the active matrix substrate have been combined to each other, the inner atmosphere of the combining device is returned to an atmospheric pressure.

Next, by use of a UV curing device, UV irradiation is carried out to a structure having a desired cell gap, so that the seal resin is temporarily hardened. Then, the structure is baked so that hardening of the structure is completed. At this point, the liquid crystal spreads out in the space formed by the seal resin and the color filter substrate, and the cell is filled with the liquid crystal. After having been baked, the structure is cut, and thus, the liquid crystal display panel is manufactured.

In the present embodiment, a liquid crystal display unit and a liquid crystal display device are arranged as below.

That is, after the liquid crystal display panel is cleaned, a polarization plate is attached to each surface of the liquid crystal display panel. It should be noted that an optical compensation sheet or the like may be stacked on the polarization plate in accordance with necessity. Then, drivers (a gate driver 102 and a source driver 101) are connected with the liquid crystal display panel, as shown in (a) of FIG. 22. The following description explains a case, as one example, where the drivers are connected with the liquid crystal display panel based on a TCP (Tape Career Package) method. According to the TCP method, at first, an ACF (Anisotropic Conductive Film) is pressed down to a terminal section of the liquid crystal display panel so that the ACF is temporarily attached to the terminal section. Then, TCPs carrying drivers are punched out from a career tape, and aligned with respect to electrodes of panel terminals, respectively. Successively, the ACF is heated so as to secure ACF's attachment to the terminal section of the liquid crystal display panel. After this, a circuit board 103 (PWB: Printed Wire Board) for connecting driver TCPs with one another is connected with an input terminal of each TCP via the ACF. By this, a liquid crystal display unit 100 is manufactured.

Figure 22:
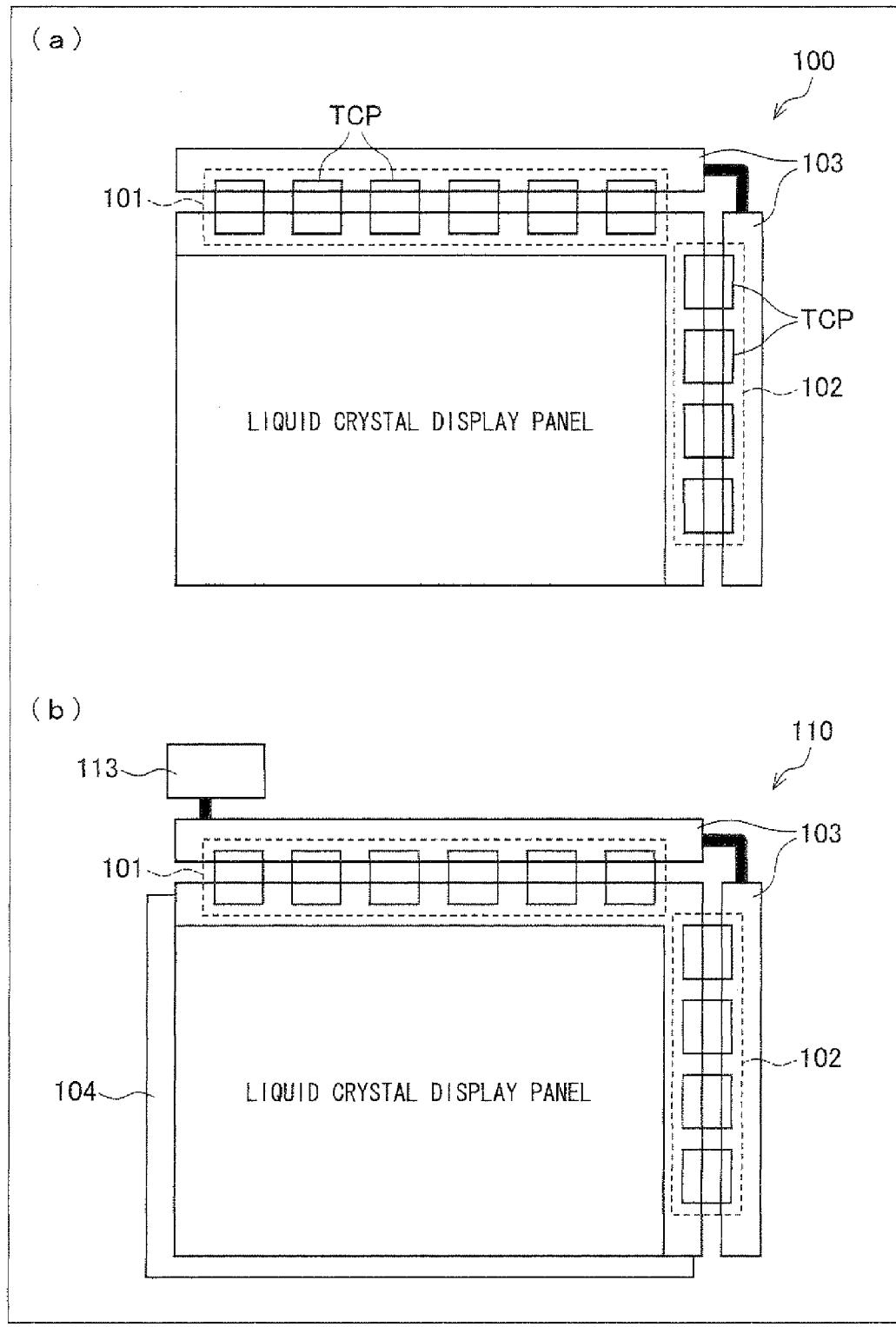
FIG. 22 is a view schematically showing an arrangement of a liquid crystal display device in accordance with the present invention.

Then, the drivers (the source driver 101 and the gate driver 102) of the liquid crystal display unit are connected with a display control circuit 113 via the circuit board 103 such that the display control circuit 113 and a lighting system (a backlight unit) 104 are integrated with each other (see (b) of FIG. 22). Thus, a liquid crystal display device 110 is manufactured.

Figure 23:
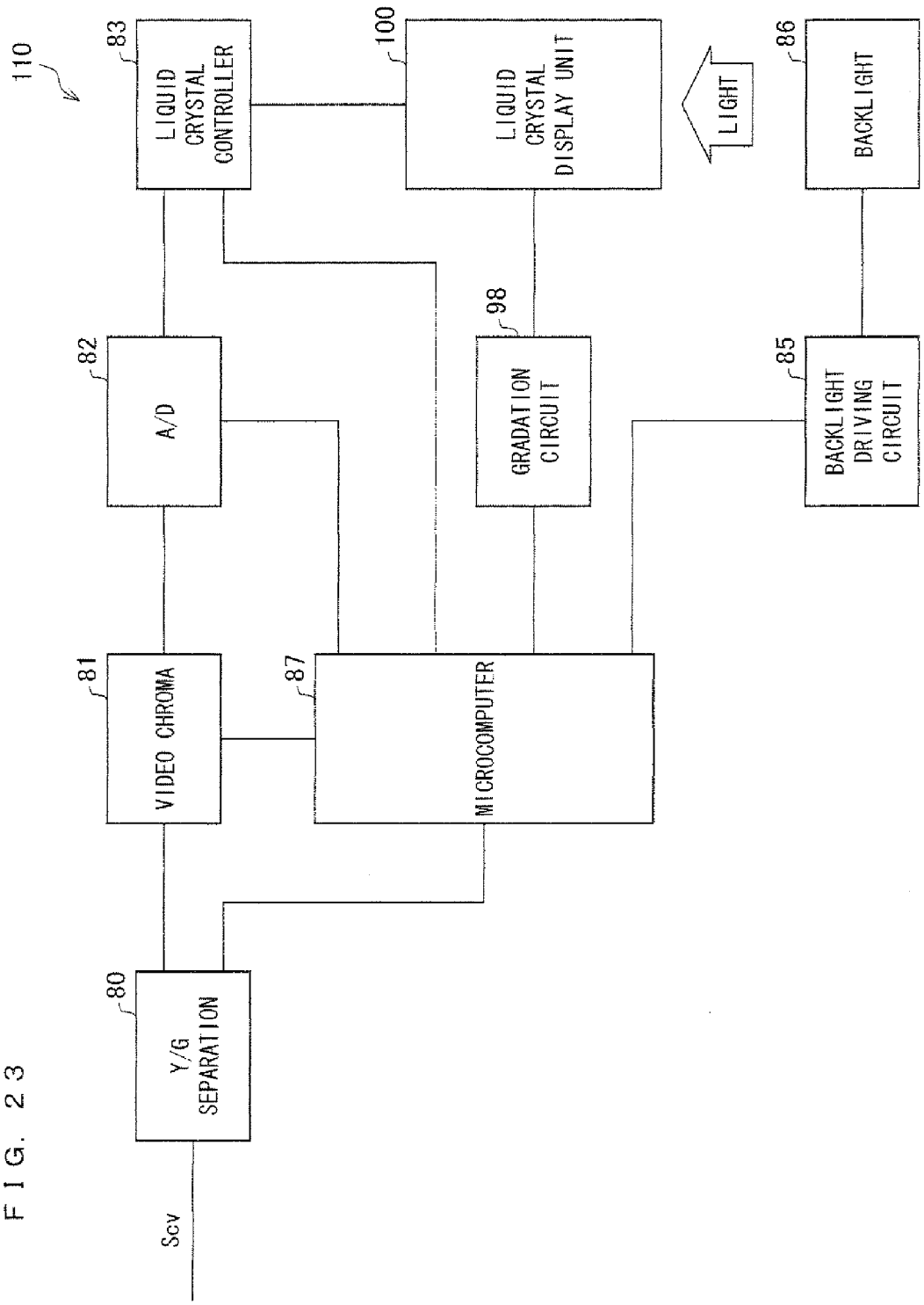
FIG. 23 is a block diagram explaining a function of the liquid crystal display device in accordance with the present invention.

Next, the following description explains one configuration example of how a liquid crystal display device of the present embodiment is used in a television receiver. FIG. 23 is a block diagram showing an arrangement of the liquid crystal display device 110 for use in the television receiver. The liquid crystal display device 110 includes the liquid crystal display unit 100, a Y/C separation circuit 80, a video chroma circuit 81, an A/D converter 82, a liquid crystal controller 83, a backlight drive circuit 85, a backlight 86, a microcomputer 87, and a gradation circuit 98.

The liquid crystal display unit 100 includes any of the liquid crystal display panels described in Embodiments 1 through 5, respectively, and a source driver and a gate driver for driving the liquid crystal display panel.

In the liquid crystal display device 110, a composite picture video signal Scv as a television signal is externally supplied to the Y/C separation circuit 80, and separated into a luminance signal and a color signal in the Y/C separation circuit 80. In the video chroma circuit 81, the luminance signal and the color signal are converted into an analog RGB signal corresponding to light's three primary colors. The analog RGB signal is then converted into a digital RGB signal by the A/D converter 82. The digital RGB signal is supplied to the liquid crystal display controller 83. Further, in the Y/C separation circuit 80, a horizontal synchronization signal and a vertical synchronization signal are also taken out from the composite picture video signal Scv that has been externally supplied, and then, the horizontal synchronization signal and the vertical synchronization signal are supplied to the liquid crystal controller 83 via the microcomputer 87.

The digital RGB signal and a timing signal, which is based on the horizontal synchronization signal and the vertical synchronization signal, are supplied from the liquid crystal controller 83 to the liquid crystal display unit 100 at given timing. Further, in the gradation circuit 98, gradation voltages for the three primary colors R, G, and B of a color display are generated, and these gradation voltages are supplied to the liquid crystal display unit 100. In the liquid crystal display unit 100, a member such as the source driver, the gate driver, or the like generates a drive signal (data signal, scanning signal, or the like) based on the RGB signal, the timing signal, and the gradation signal. In response to the drive signal, a display section in the liquid crystal display unit 100 displays a color image. It should be noted that in order that the liquid crystal display unit 100 displays an image, it is required to irradiate light from a back of the liquid crystal display unit 100. In the liquid crystal display device 110, the backlight drive circuit 85 drives the backlight 86 under control of the microcomputer 87, so that the liquid crystal display panel of the present embodiment is irradiated with light from its back.

The microcomputer 87 caries out control over an entire system, including the above process. Usable examples of an externally supplied video signal (composite picture video signal) may include a video signal of an image on television broadcasting, a video signal of an image captured by a camera, and a video signal of an image supplied via the Internet network, and as such, it is possible that an image display in response to a variety of video signals be carried out in the liquid crystal display device 110.

Figure 24:
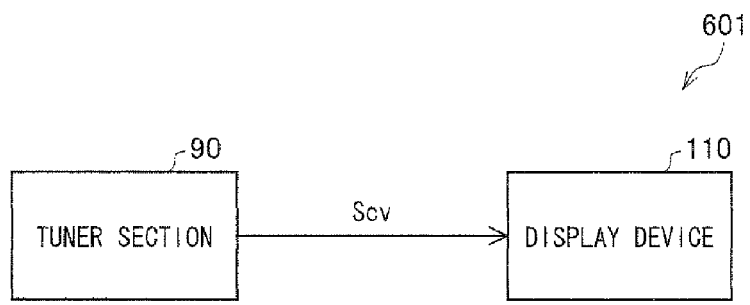
FIG. 24 is a block diagram explaining a function of a television receiver in accordance with the present invention.

In a case where the liquid crystal display device 110 displays an image in response to the television broadcasting in, the liquid crystal display device 110 is connected with a tuner section 90 so as to constitute a television receiver 601 of the present embodiment (see FIG. 24). Out of a receiving wave (a high frequency signal) that has been received by an antenna (which is not illustrated), the tuner section 90 takes out a channel signal to receive and then converts it into an intermediate frequency signal, and detects the intermediate frequency signal, so that a composite picture video signal Sc serving as a television signal can be taken out. The composite picture video signal Scv is supplied to the liquid crystal display device 110 in the way described above, and then, the liquid crystal display device 110 displays an image based on the composite picture image video Scv.

Figure 25:
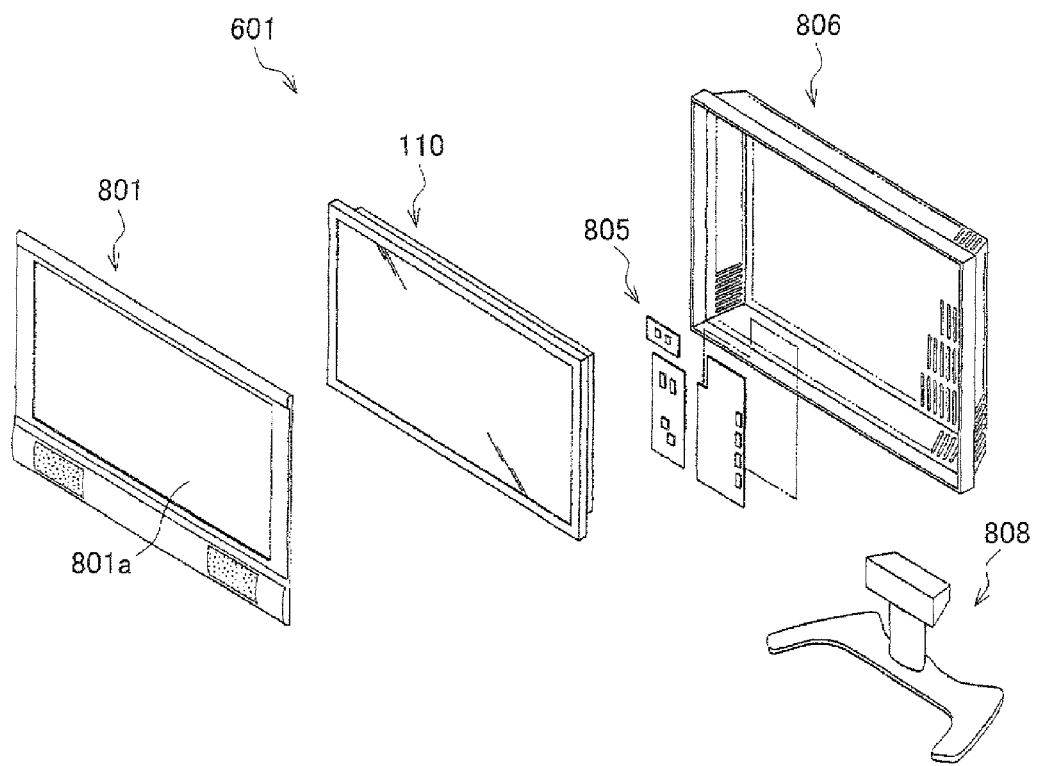
FIG. 25 is an exploded perspective view showing an arrangement of the television receiver in accordance with the present invention.

FIG. 25 is an exploded perspective view showing one configuration example of the television receiver of the present embodiment. As shown in FIG. 25, the television receiver 601 of the present embodiment includes, as its components, a first chassis 801 and a second chassis 806, besides the liquid crystal display device 110. The television receiver 601 of the present embodiment is arranged such that the liquid crystal display device 110 is sandwiched by the first chassis 801 and the second chassis 806 so as to be housed in them. In the first chassis 801, an aperture section 801a is formed, through which aperture section 801a an image to be displayed by the liquid crystal display device 110 transmits. The second chassis 806, on the other hand, covers a back surface side of the liquid crystal display device 110. The second chassis 806 is provided with an operation circuit 805 that operates the liquid crystal display device 110, and attached with a support member 808 on its bottom.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

A liquid crystal display panel and a liquid crystal display device of the present invention are suitable, for example, for use in a liquid crystal television.

The invention claimed is:

1. A liquid crystal display panel comprising:
 a first substrate including a transistor, a pixel electrode, a signal line, and first and second adjacent storage capacitor lines;
 a liquid crystal material; and
 a second substrate including a counter electrode and a light shielding layer, wherein:
 a spacer is provided between the first and the second substrates;
 one of the first and the second substrates includes a step section for restricting a movement of the spacer, the step section being provided so as to surround the spacer; and
 in plane view, the step section is located between the first and second adjacent storage capacitor lines.

2. The liquid crystal display panel as set forth in claim 1, wherein the step section and the signal line overlap each other.

3. The liquid crystal display panel as set forth in claim 1, wherein the second substrate includes the step section.

4. The liquid crystal display panel as set forth in claim 3, wherein:
 the step section is formed by a depression in a surface of the second substrate, and the depression is formed by boring or thinning a part of the light shielding layer.

5. The liquid crystal display panel as set forth in claim 3, wherein:
 the step section is formed by a depression in a surface of the second substrate, and the depression is formed by boring or thinning a part of an insulating film provided above the light shielding layer.

6. The liquid crystal display panel as set forth in claim 3, wherein:
 the second substrate includes a colored layer; and an end part of the colored layer and the light shielding layer overlap each other, so that at least a part of the step section is formed.

7. The liquid crystal display panel as set forth in claim 4, wherein the light shielding layer constitutes a black matrix.

8. The liquid crystal display panel as set forth in claim 4, wherein the light shielding layer is able to be formed based on an application method.

9. The liquid crystal display panel as set forth in claim 1, wherein the first substrate includes the step section.

10. The liquid crystal display panel as set forth in claim 9, wherein:
 the step section is formed by a depression in a surface of the first substrate, and the depression is formed by boring or thinning a part of an insulating film provided in the first substrate.

11. The liquid crystal display panel as set forth in claim 10, wherein the insulating film is a gate insulating film.

12. The liquid crystal display panel as set forth in claim 10, wherein the insulating film is an interlayer insulating film provided above a gate insulating film.

13. The liquid crystal display panel as set forth in claim 10, wherein the insulating film is able to be formed based on an application method.

14. The liquid crystal display panel as set forth in claim 10, wherein the insulating film contains an organic matter.

15. The liquid crystal display panel as set forth in claim 10, wherein the insulating film contains at least one of an acrylic resin, an epoxy resin, a polyimide resin, a polyurethane resin, a novolac resin, and a polysiloxane resin.

16. The liquid crystal display panel as set forth in claim 11, wherein the gate insulating film includes plural gate insulating layers, and at least one of the gate insulting layers is partially bored.

17. The liquid crystal display panel as set forth in claim 12, wherein the interlayer insulating film includes plural interlayer insulating layers, and at least one of the interlayer insulating layers is partially bored.

18. The liquid crystal display panel as set forth in claim 9, wherein the step section is formed by a contact hole for electrically connecting the transistor with the pixel electrode.

19. The liquid crystal display panel as set forth in claim 2, wherein the signal line is any of a scanning signal line and a data signal line.

20. The liquid crystal display panel as set forth in claim 1, wherein plural spacers are provided in a region surrounded by the step section.

21. The liquid crystal display panel as set forth in claim 1, wherein the other of the first and the second substrates includes a step section.

22. The liquid crystal display panel as set forth in claim 1, wherein the spacer has a spherical shape.

23. The liquid crystal display panel as set forth in claim 1, wherein the spacer is provided based on an ink jet method.

24. The liquid crystal display panel as set forth in claim 1, wherein plural spacers including the spacer are provided in a region surrounded by the step section, and the region has an area that is set based on the number of the spacers and a size of each of the spacers.

25. The liquid crystal display panel as set forth in claim 24, wherein the spacers are provided by use of an ink jet device, and the region has the area that is also set based on an application accuracy of the ink jet device.

26. The liquid crystal display panel as set forth in claim 1, wherein the first substrate is an active matrix substrate, and the second substrate is a color filter substrate.

27. A liquid crystal display unit, comprising: a liquid crystal display panel as set forth in claim 1; and a driver.

28. A liquid crystal display device, comprising: a liquid crystal display unit as set forth in claim 27; and a lighting system.

29. A television receiver, comprising a liquid crystal display device as set forth in claim 28 and a tuner section for receiving television broadcasting.

30. A method for manufacturing a color filter substrate that faces, in a liquid crystal display panel, an active matrix substrate via a spacer, the method comprising the steps of:
   providing plural colored layers at intervals on a transparent substrate;
   providing a negative type black photosensitive resin film on the colored layers and in a gap formed by adjacent colored layers;
   carrying out exposure to a front surface of the negative type black photosensitive resin film by use of a mask that has a pattern surrounding a thin film section forming region in the gap formed by the adjacent colored layers;
   carrying out exposure to a back surface of the negative type black photosensitive resin film by use of the colored layers as a mask; and
   carrying out development such that the negative type black photosensitive resin film on the colored layers is removed and that the negative type black photosensitive resin film in the thin film section forming region is removed to a given depth from a surface of the negative type black photosensitive resin film.

* * * * *